(12) United States Patent
Andon et al.

(10) Patent No.: US 11,722,537 B2
(45) Date of Patent: *Aug. 8, 2023

(54) COMMUNICATION SESSIONS BETWEEN COMPUTING DEVICES USING DYNAMICALLY CUSTOMIZABLE INTERACTION ENVIRONMENTS

(71) Applicant: SaySearch, Inc., Nashua, NH (US)

(72) Inventors: Charles A. Andon, Nashua, NH (US); Steven W. Hansen, Groton, MA (US)

(73) Assignee: SaySearch, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/138,637

(22) Filed: Dec. 30, 2020

(65) Prior Publication Data

US 2021/0120054 A1   Apr. 22, 2021

Related U.S. Application Data

(63) Continuation of application No. 15/959,009, filed on Apr. 20, 2018, now Pat. No. 10,917,445.

(Continued)

(51) Int. Cl.
*H04L 65/4053* (2022.01)
*G06T 19/00* (2011.01)
(Continued)

(52) U.S. Cl.
CPC ........ *H04L 65/4053* (2013.01); *G06T 19/003* (2013.01); *G06T 19/20* (2013.01); *H04L 65/1089* (2013.01); *H04L 65/403* (2013.01)

(58) Field of Classification Search
CPC ..... G06T 19/003; G06T 19/20; H04L 65/403; H04L 65/1089; H04L 65/4053
See application file for complete search history.

(56) References Cited

U.S. PATENT DOCUMENTS 9,983,759 B1 * 5/2018 Dhawan ................ G06F 40/166
11,176,098 B2 * 11/2021 Skidmore ............... H04W 4/60
(Continued)

*Primary Examiner* — Ramy M Osman
(74) *Attorney, Agent, or Firm* — VLP Law Group LLP; James A. D. White

(57) ABSTRACT

Techniques are described for providing and managing interactive communication sessions between client computing devices, such as via Web browser software executing on the client computing devices to interact with server computer devices providing a shared visual interaction environment for the devices, and with the shared visual interaction environment being dynamically customizable to add and/or remove selected types of functionality that have corresponding visual representations in the shared visual interaction environment. In some situations, the described techniques include providing multiple predefined types of functionality and/or enabling users to add new types of user-defined functionality, using visible layers that each present one or more types of visual information or other visual effects corresponding to at least one of the functionality types. In some situations, the techniques support an augmented reality and/or virtual reality system, and enable control over a variety of types of communication-enabled physical objects (e.g., the Internet of Things).

20 Claims, 14 Drawing Sheets

Related U.S. Application Data

(60) Provisional application No. 62/487,871, filed on Apr. 20, 2017.

(51) Int. Cl.
   *G06T 19/20*      (2011.01)
   *H04L 65/1089*   (2022.01)
   *H04L 65/403*    (2022.01)

(56) References Cited

U.S. PATENT DOCUMENTS

| | | | |
|---|---|---|---|
| 2007/0198534 A1* | 8/2007 | Hon | G06F 16/44 |
| 2008/0050715 A1* | 2/2008 | Golczewski | G06Q 20/102 |
| | | | 434/350 |
| 2008/0069011 A1* | 3/2008 | Sekaran | H04L 12/1813 |
| | | | 370/260 |
| 2011/0087764 A1 | 4/2011 | Yaffe et al. | |
| 2012/0209694 A1* | 8/2012 | Kunchakarra | G06Q 30/02 |
| | | | 705/14.41 |
| 2012/0260195 A1 | 10/2012 | Hon et al. | |
| 2014/0002443 A1 | 1/2014 | Cunningham | |
| 2014/0123168 A1* | 5/2014 | Reisman | H04L 69/329 |
| | | | 725/25 |
| 2018/0308287 A1* | 10/2018 | Daniels | G06F 3/04842 |
| 2019/0066380 A1* | 2/2019 | Berk | G06F 3/012 |
| 2019/0362312 A1* | 11/2019 | Platt | H04L 65/1069 |
| 2020/0076748 A1* | 3/2020 | Han | H04L 51/10 |
| 2022/0086205 A1* | 3/2022 | LeBeau | H04L 65/403 |

\* cited by examiner

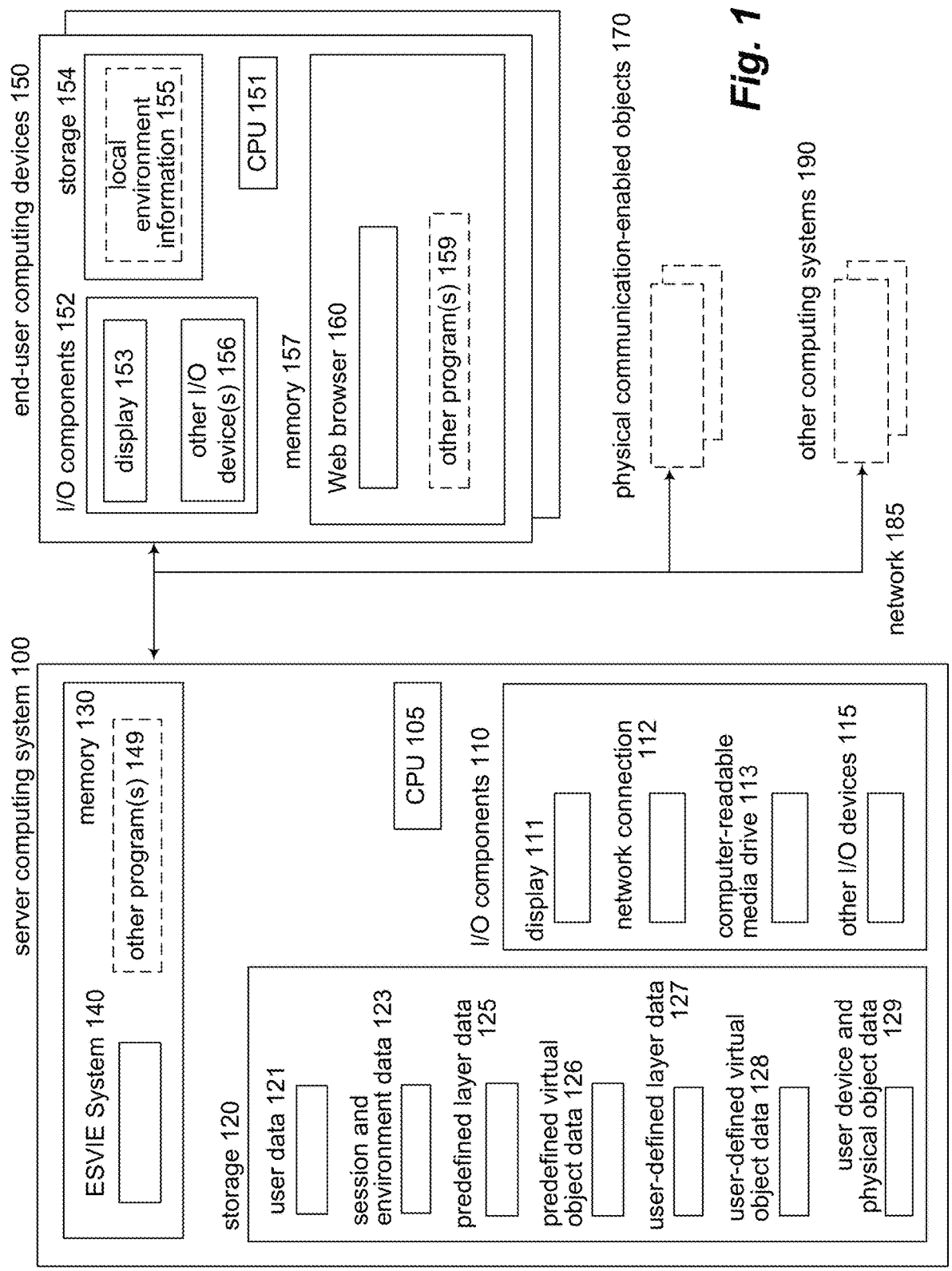

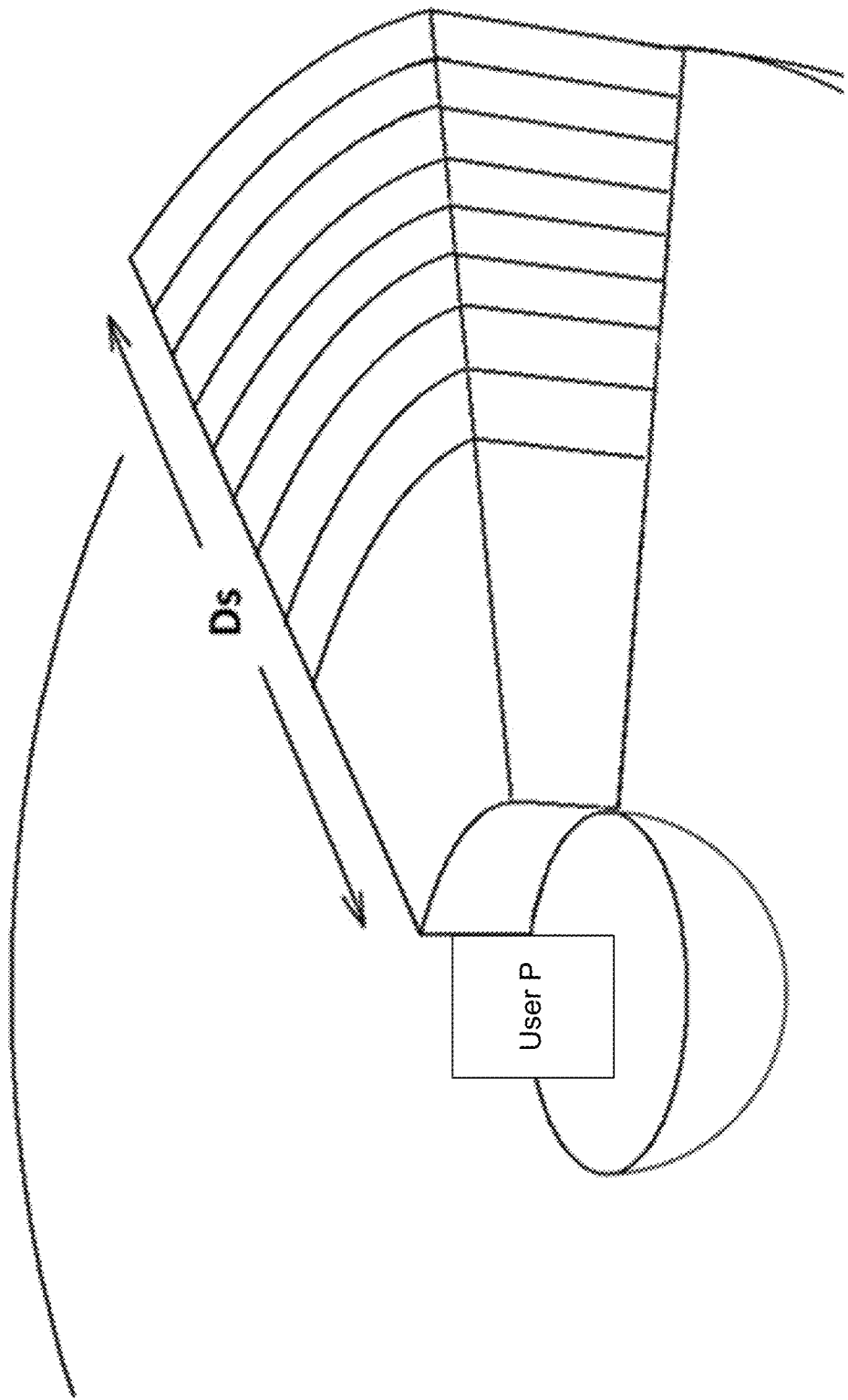
Fig. 2-1  Single Participant With Dimensional Stack Of Multiple Layers

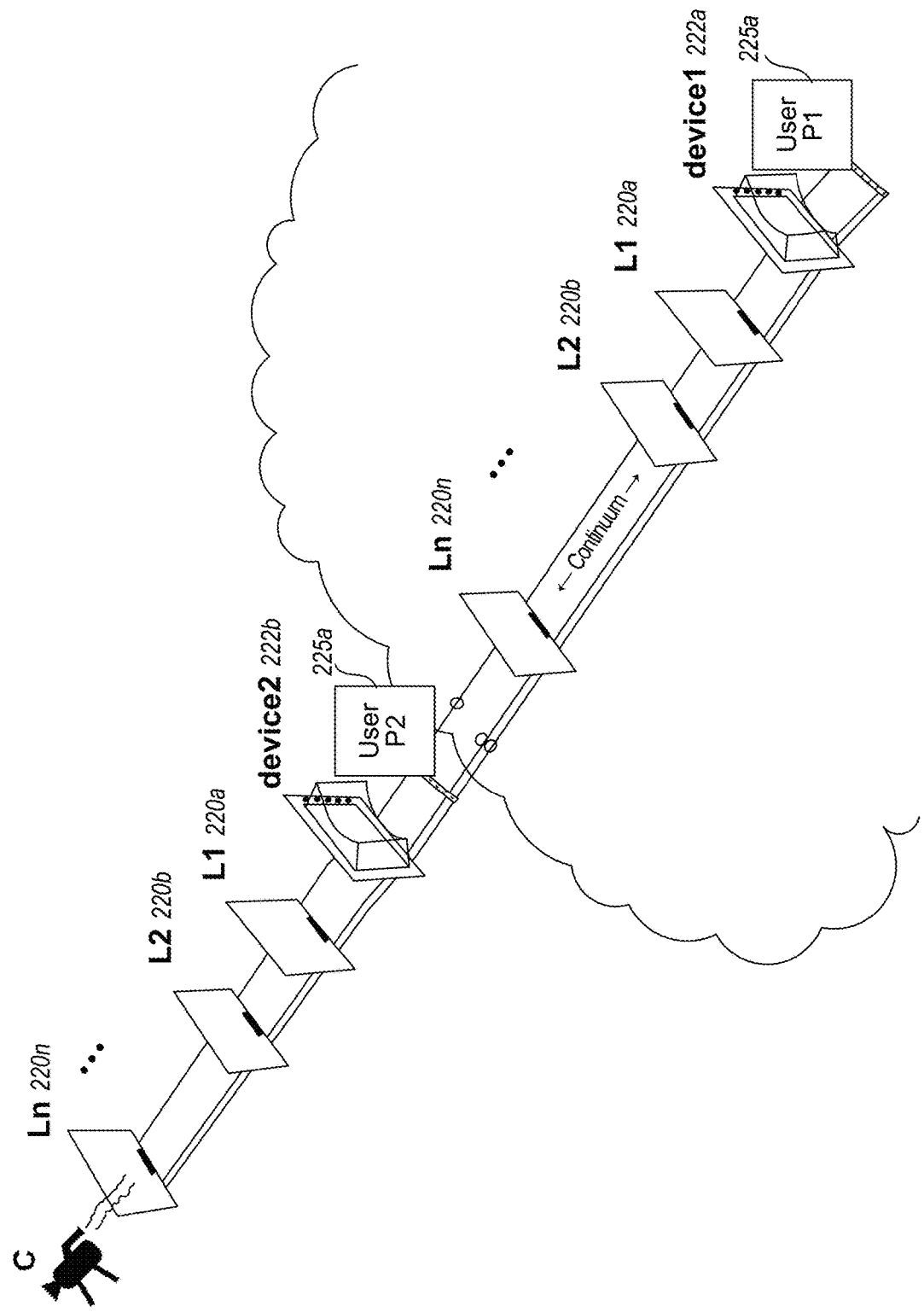

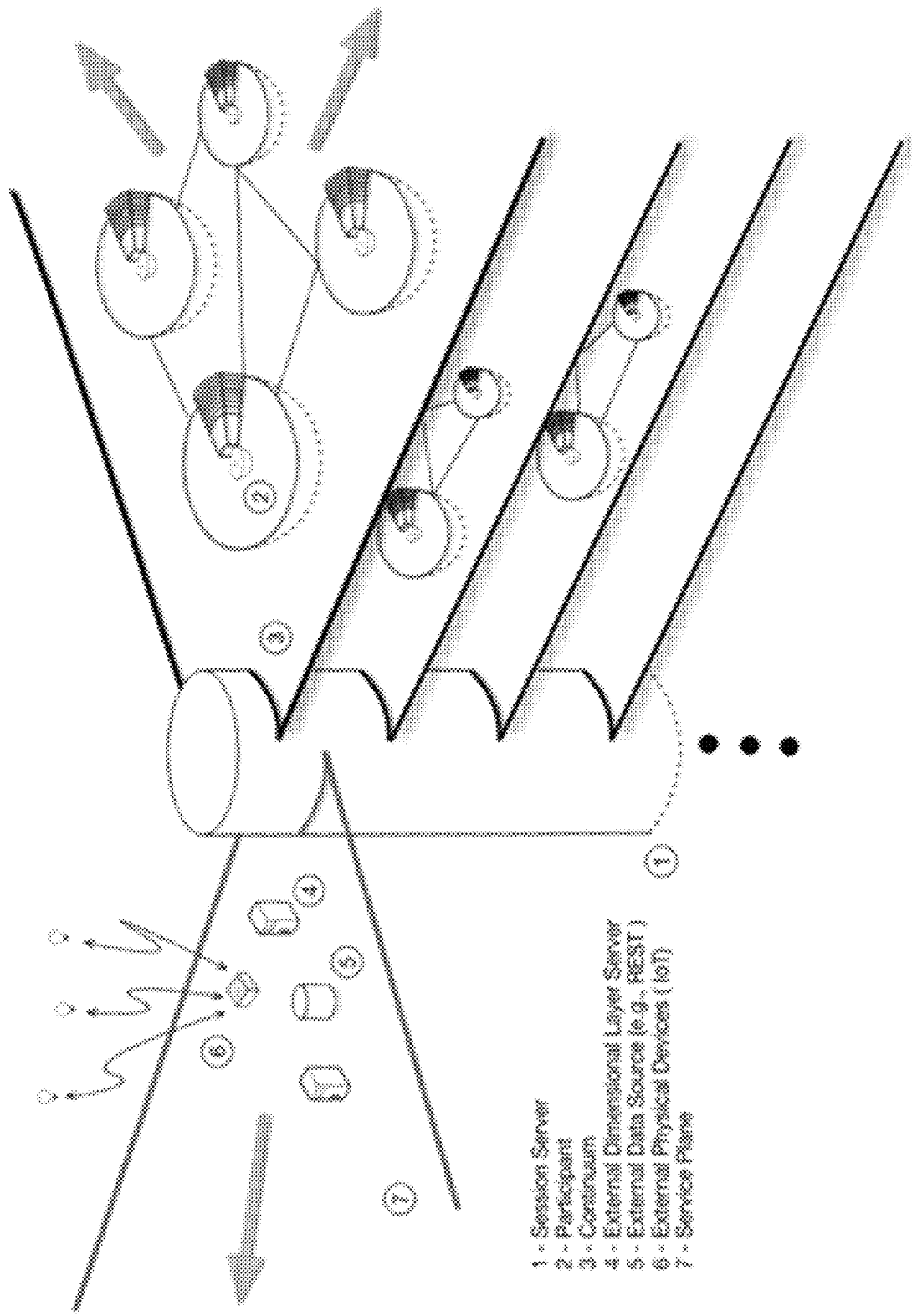

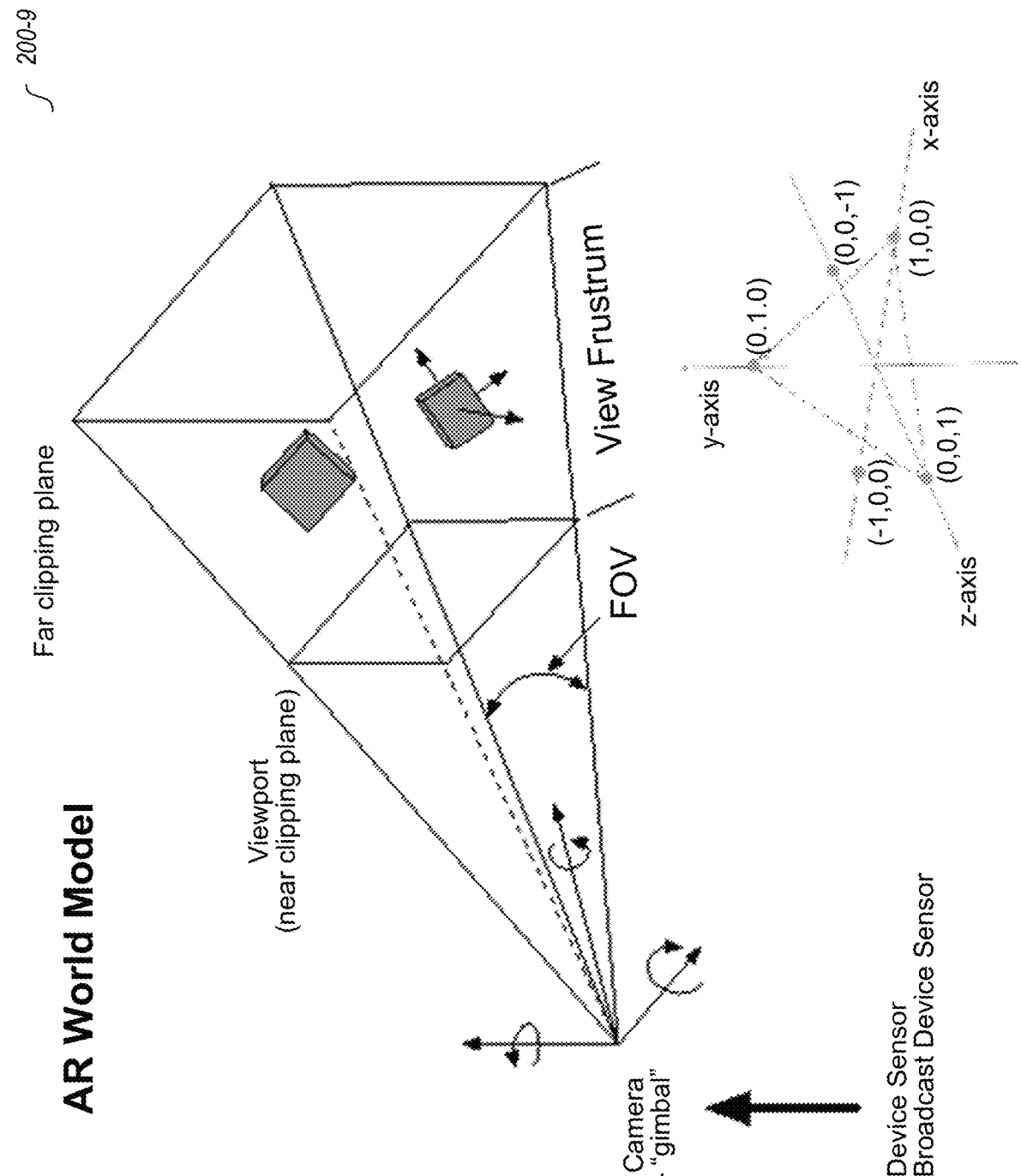

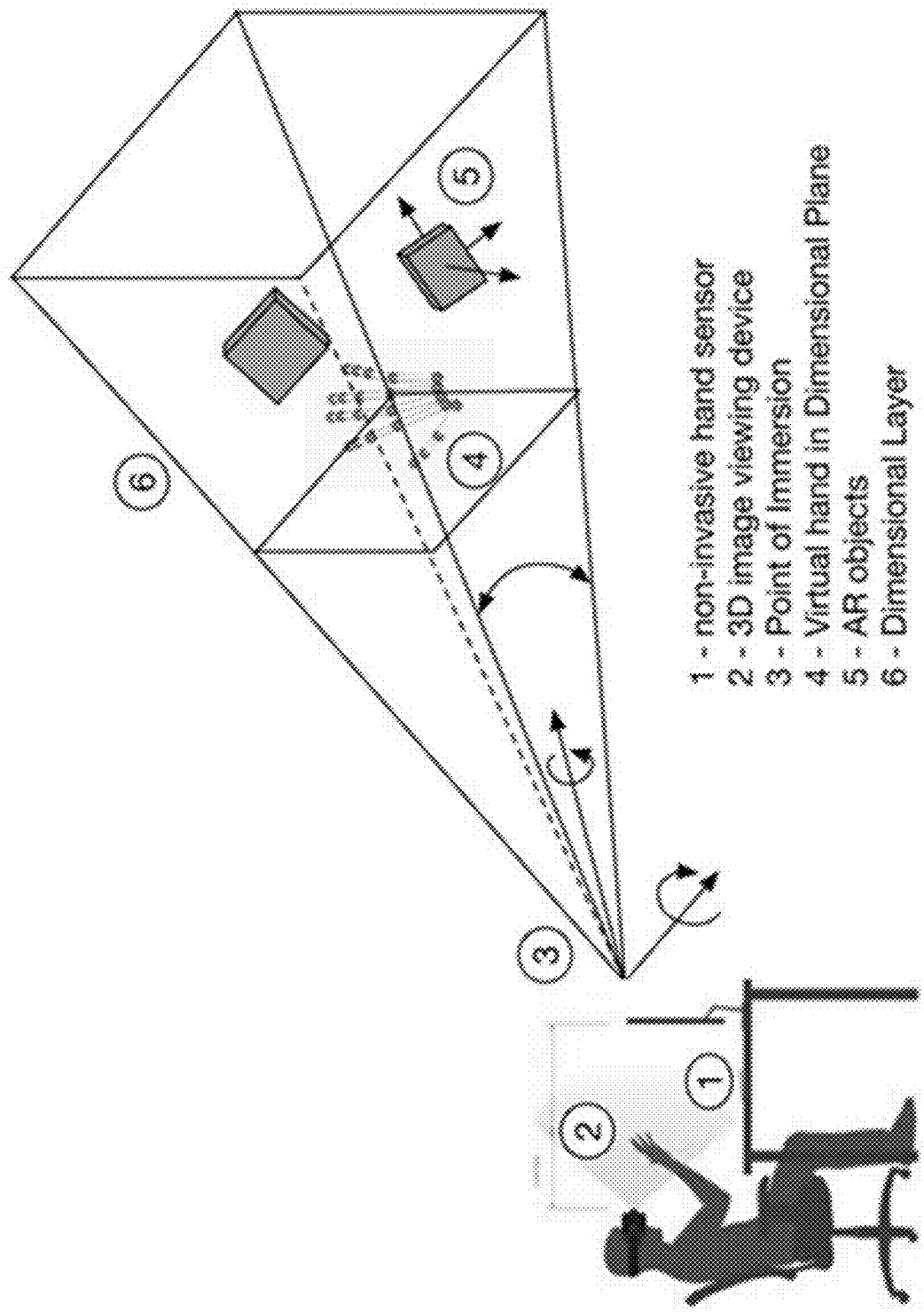
*Fig. 2-10* Participant Immersed With Non-Invasive Hand/Arm Sensor
1 - non-invasive hand sensor
2 - 3D image viewing device
3 - Point of Immersion
4 - Virtual hand in Dimensional Plane
5 - AR objects
6 - Dimensional Layer

COMMUNICATION SESSIONS BETWEEN COMPUTING DEVICES USING DYNAMICALLY CUSTOMIZABLE INTERACTION ENVIRONMENTS

CROSS-REFERENCE TO RELATED APPLICATIONS

This application is a continuation of co-pending U.S. patent application Ser. No. 15/959,009, filed Apr. 20, 2018 and entitled "Communication Sessions Between Computing Devices Using Dynamically Customizable Interaction Environments", which is hereby incorporated by reference in its entirety. U.S. patent application Ser. No. 15/959,009 claims the benefit of U.S. Provisional Patent Application No. 62/487,871, filed Apr. 20, 2017 and entitled "Communication Sessions Between Computing Devices Using Dynamically Customizable Interaction Environments," which is hereby incorporated by reference in its entirety.

TECHNICAL FIELD

The following disclosure relates generally to computer-implemented techniques for providing and managing an interactive communication session involving multiple participants, such as to provide a shared visual interaction environment between multiple client computing devices executing Web browser software that is dynamically customizable with selected types of functionality being added and/or removed.

BACKGROUND

Various techniques have been used to allow communication sessions between users, including email exchanges, chat sessions, instant messaging exchanges, Voice over Internet Protocol ("VoIP") calls and other telephone calls (optionally with one-way or two-way video), online bulletin boards, etc. However, existing communication sessions between users have various types of problems, including lacking various types of useful functionality with respect to displaying and interacting with visual representations of information and functionality during the sessions.

BRIEF DESCRIPTION OF THE DRAWINGS

FIG. 1 is a block diagram illustrating example computing systems suitable for executing an embodiment of a system for providing and managing interactive communication sessions involving multiple participants.

FIGS. 2-1 to 2-10 illustrate examples of techniques related to providing and managing interactive communication sessions involving multiple participants.

DETAILED DESCRIPTION

Figures 2, 3, 4:
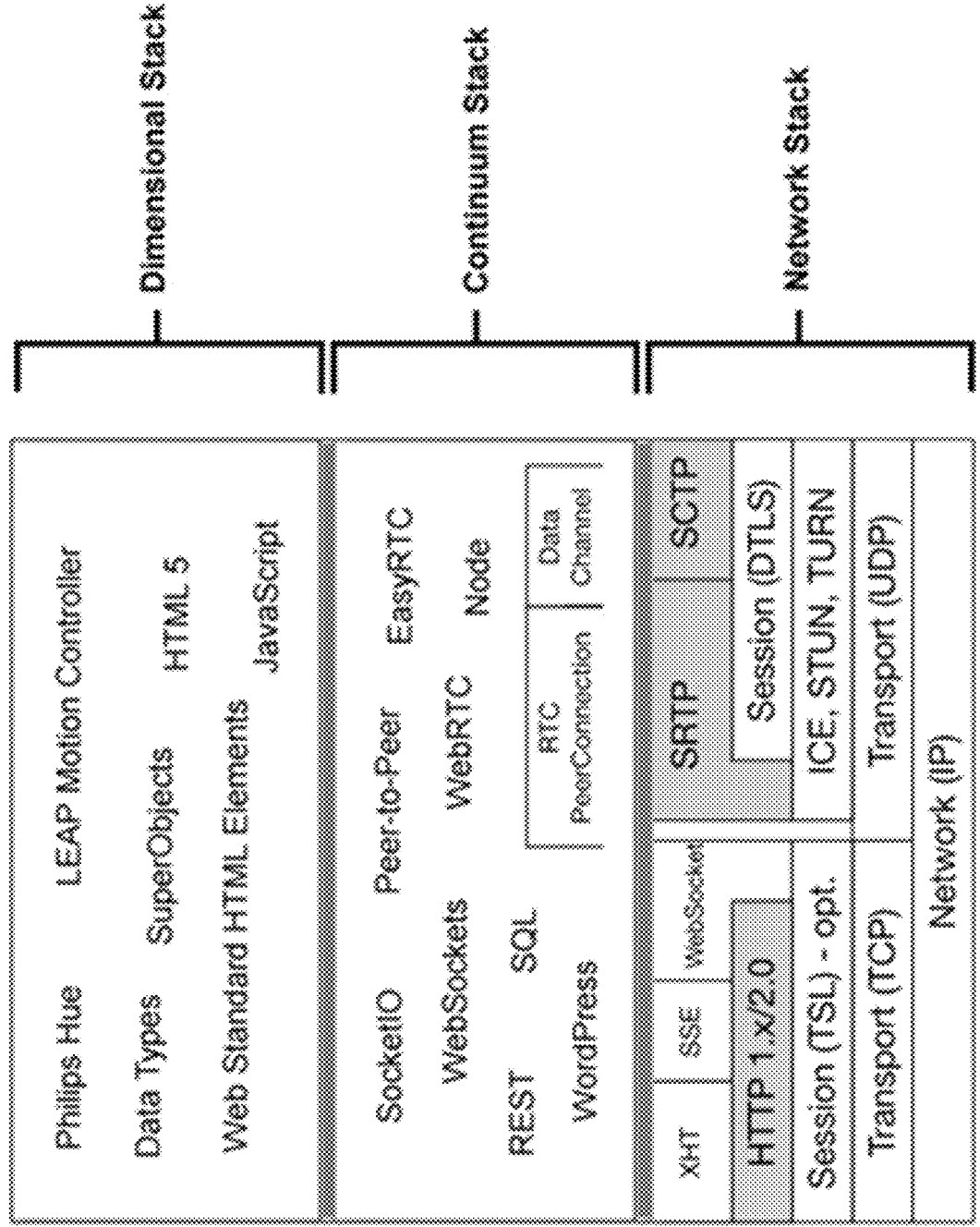
Figures 2, 3, 4, 5:
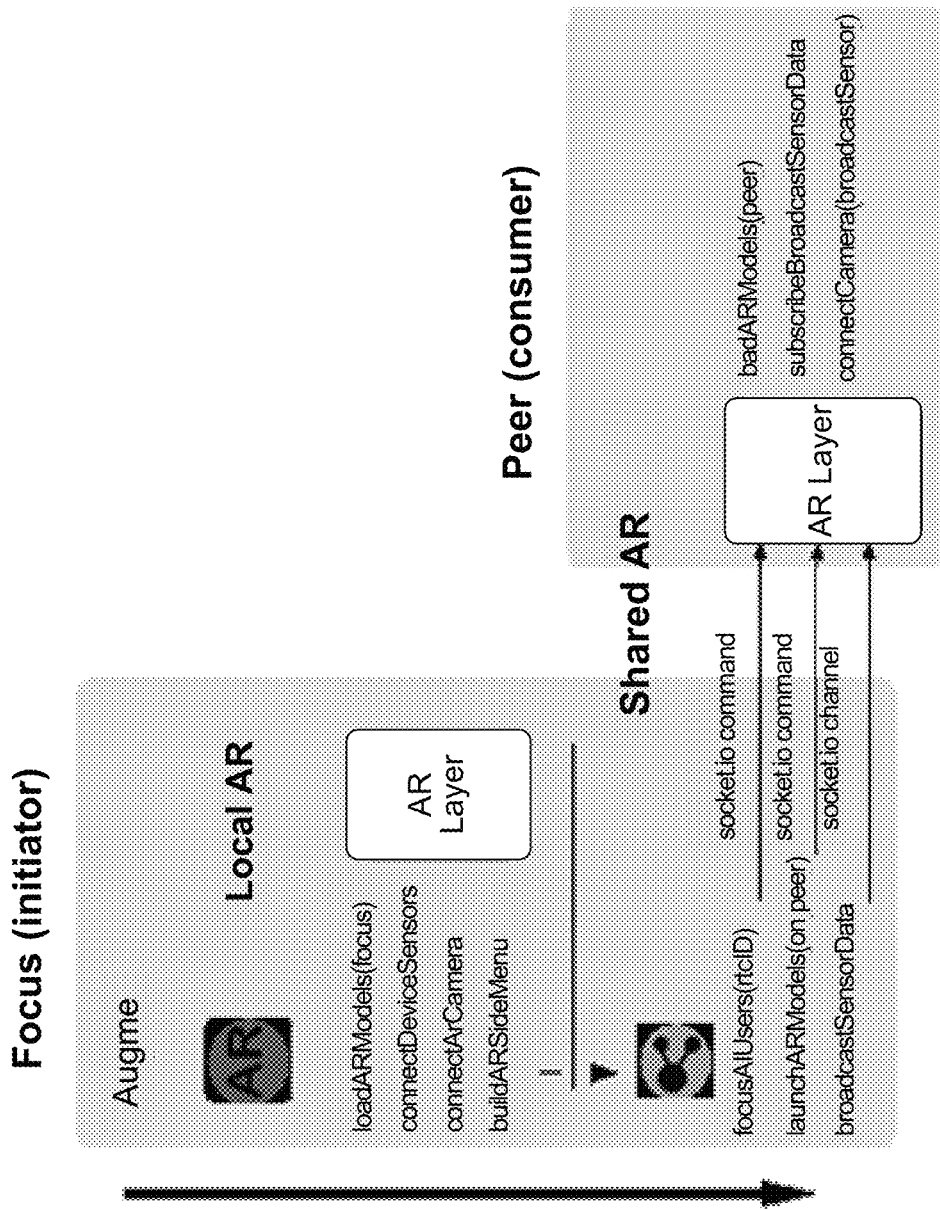
Figures 2, 3, 4, 5, 6:
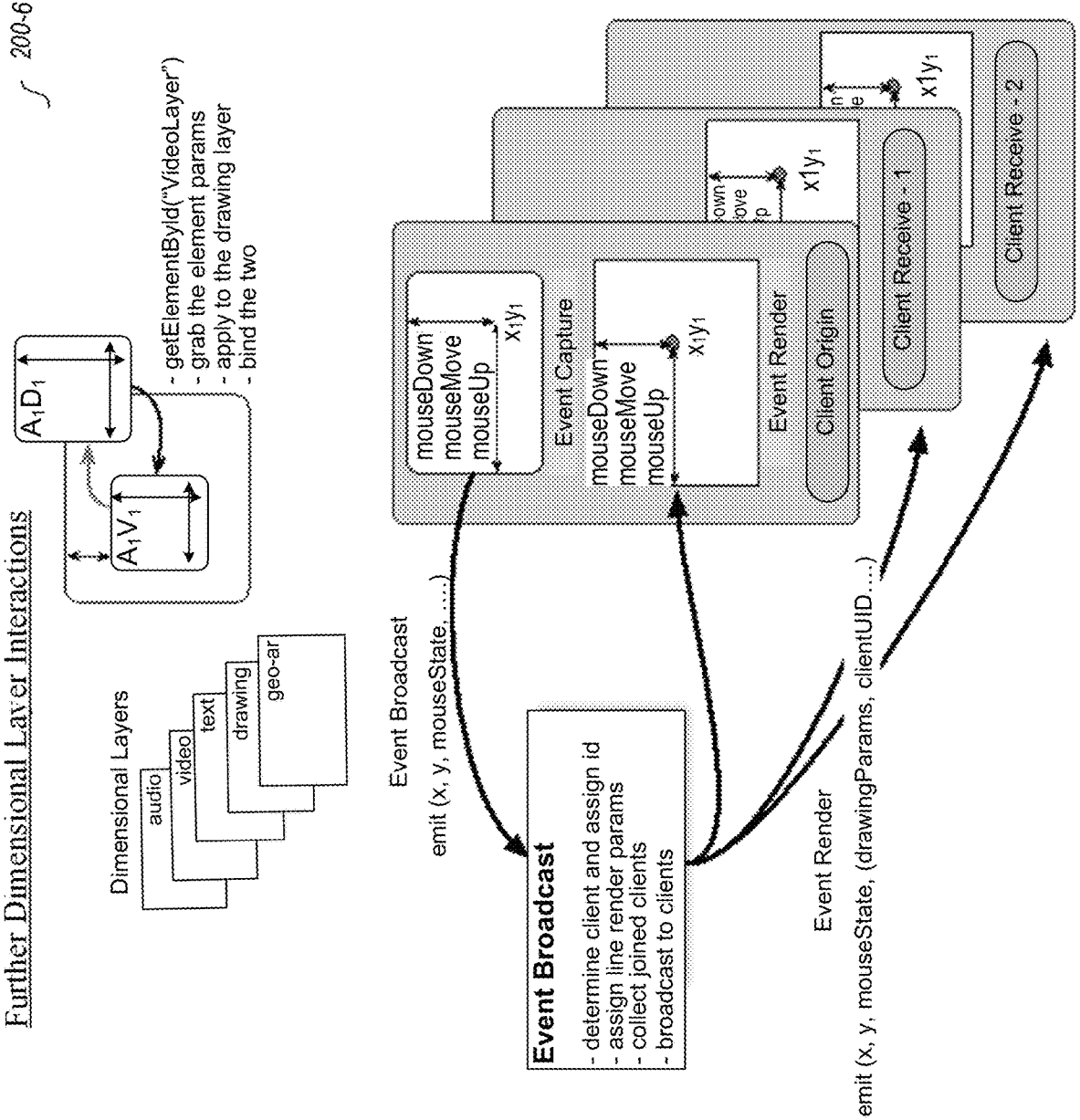
Figures 2, 3, 4, 5, 6, 7:
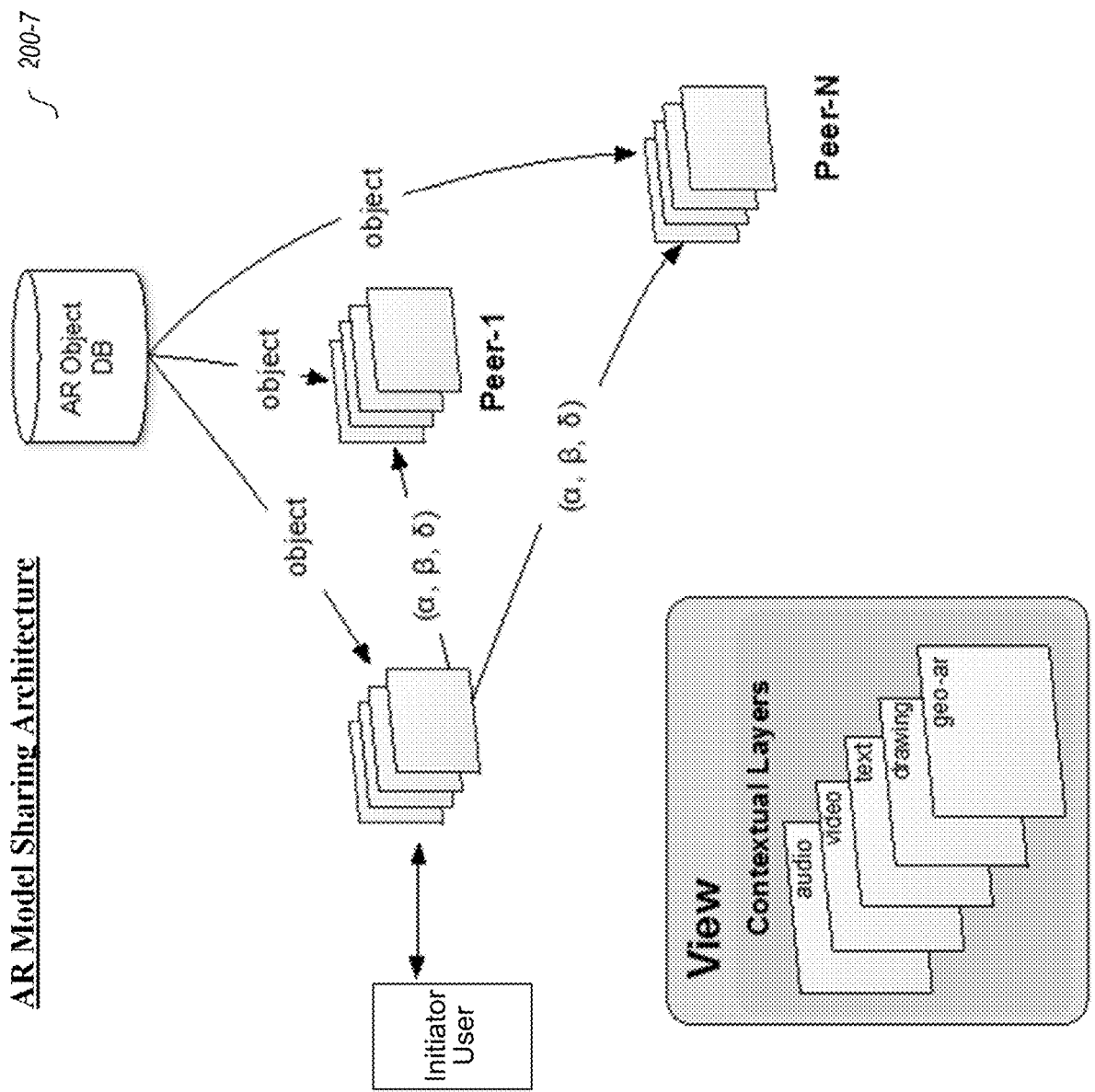
Figures 2, 3, 4, 5, 6, 7, 8:
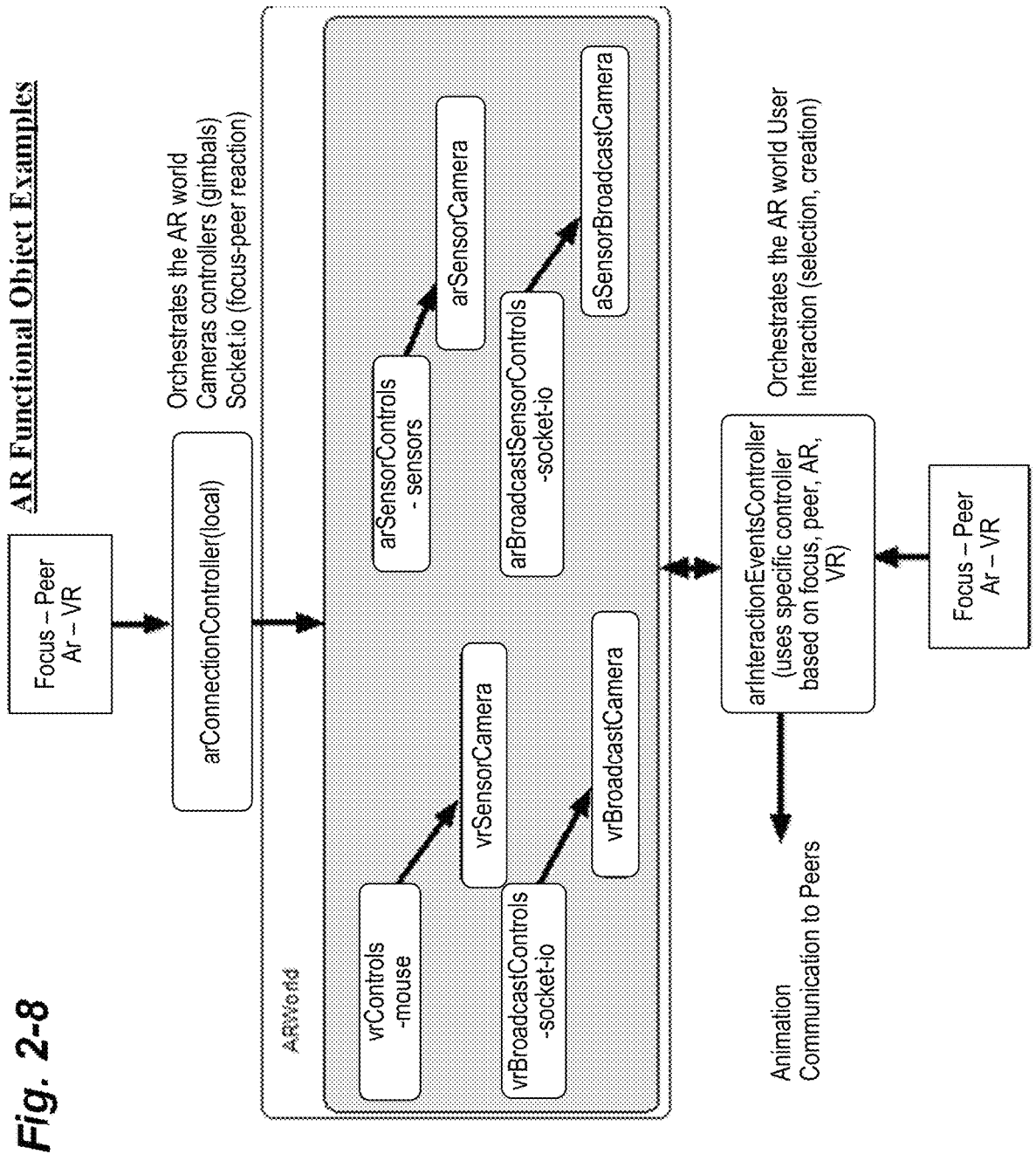

Techniques are described for providing and managing interactive communication sessions between client computing devices using dynamically customizable shared functionality. In at least some embodiments, the described techniques include using executing Web browser software on the client computing devices to interact with one or more server computer devices that perform the management of the interactive communication sessions (also referred to herein as "interaction sessions"), such as to provide a shared visual interaction environment between multiple client computing devices executing Web browser software for a particular interactive communication session, with the shared visual interaction environment being dynamically customizable with selected types of functionality being added and/or removed, and with visual representations of the current functionality types being presented to the participants in the shared visual interaction environment. Additional details related to the described techniques are included below, and in at least some embodiments are performed by automated operations of a computer-implemented Extensible Shared Visual Interaction Environment ("ESVIE") system.

In at least some embodiments, the described techniques include the ESVIE system providing multiple predefined types of functionality that may be selectively and dynamically added to the shared visual interaction environment for a particular interactive communication session. In addition, the shared visual interaction environment may in some embodiments be constructed using multiple visible layers that each present one or more types of visual information or other visual effects—in at least some such embodiments, each of the predefined types of functionality may be associated with its own visible layer that may be selectively and dynamically added or removed from the shared visual interaction environment for the interactive communication session, such as to provide or remove access to a predefined type of functionality via the visual elements of its corresponding visible layer. Furthermore, some or all layers may each include one or more virtual objects, such as to represent corresponding real-world physical objects and/or users, as discussed in greater detail below.

In addition, in at least some embodiments, the described techniques further include the ESVIE system providing an extensible architecture via which users of the ESVIE system and/or other entities may add new types of user-defined functionality that may be selectively and dynamically added to the shared visual interaction environment for a particular interactive communication session, whether in addition to or instead of the predefined types of functionality. In such embodiments, the ESVIE system may provide an API ("application programming interface") or other interface via which the users or other entities may add a new type of user-defined functionality, optionally with specified criteria that impose restrictions on or otherwise control the use of that type of functionality. As with predefined types of functionality (if present in a particular embodiment), the ESVIE system may use visual layers to represent some or all of the new user-defined functionality types, such as to have a separate visible layer for each new type of user-defined functionality (e.g., by the user defining a new layer and indicating that it has the specified type of functionality), and/or to have one or more visible layers to which one or more users or other entities may add new virtual objects that each implement at least one type of user-defined functionality (optionally based on interaction with or other combination with other virtual objects on the same visible layer), as discussed in greater detail below.

In some embodiments, the ESVIE system may implement a particular shared visual interaction environment in a manner to support an augmented reality ("AR") and/or virtual reality ("VR") system, such as via a computing device with a display screen, and/or via specialized hardware display devices (e.g., display goggles or other head-mounted displays), and optionally by using one or more visible layers that each includes one or more images (e.g., a video with a series of image frames) of a user's actual environment (e.g., via a camera or other recorder in that actual environment) and/or of another actual or simulated environment. Virtual reality systems often envelop a user's eyes completely, and substitute a "virtual" reality for the actual view (or actual reality) in front of the user, while augmented reality systems often provide a semi-transparent or transparent overlay of one or more layers in front of a user's eyes such that actual view is augmented with additional information. In many virtual reality and augmented reality systems, the physical movement of a user (e.g., a wearer of a head mounted display) and/or the movement of the user's eyes may be tracked in various manners, such as via sensors (e.g., in the head mounted display and/or external to it), in order to enable the images being shown to reflect user movements. In addition, in at least some embodiments the ESVIE system allows actual physical objects to be represented in a shared visual interaction environment with a virtual avatar or other visual representation (e.g., with one or more such actual physical objects each having an associated visual layer for its visual representation), with users participating in the shared visual interaction environment allowed in at least some such embodiments to control the actual physical objects via interactions with their virtual avatars or other visual representations, optionally in accordance with access permissions or other restrictions associated with some or all such physical objects and their virtual representations—in this manner, physical objects may be introduced to and interacted with in a shared visual interaction environment, such as to enable control over a variety of types of communication-enabled physical objects (e.g., the Internet of Things, or "IoT").

Additional details are included below related to embodiments of the ESVIE system, including further details related to visual layers and associated types of functionality used in shared visual interaction environments, and further details related to interactions with physical objects via visual representations in shared visual interaction environments.

FIG. 1 is a block diagram illustrating example computing systems suitable for executing an embodiment of a system for providing and managing an interactive communication session involving multiple participants, such as to provide a shared visual interaction environment between multiple client computing devices executing Web browser software that is dynamically customizable with selected types of functionality being added and/or removed. In particular, FIG. 1 illustrates a server computing system 100 suitable for executing an embodiment of an ESVIE ("Extensible Shared Visual Interaction Environment") system 140 that manages interactions between various end-user computing devices 150 over a network 185. The network 185 may include publicly-accessible networks such as the Internet and/or the World Wide Web, and may also include one or more private networks, such as private cellular telephone networks or private local-area networks ("LANs"). While not illustrated here, in some embodiments the server system 100 may include multiple computing systems, some or all of which may be co-located or otherwise associated, while others of which may be located remotely from other such computing systems. In addition, while not illustrated here, various modules or components of the system 140 may be present and used in at least some embodiments, as discussed elsewhere herein.

In the illustrated embodiment, the server computing system 100 has components that include one or more hardware CPU processors 105, various I/O hardware components 110, storage 120, and memory 130. The illustrated I/O components 110 include a display 111, a network connection 112, a computer-readable media drive 113, and other I/O devices 115 (e.g., a keyboard, a mouse, speakers, etc.). In addition, the end-user computing devices 150 and other computing systems 190 may also each include similar components to some or all of the components illustrated with respect to the server computing system 100, but at least some such components are not illustrated in this example for the sake of brevity. For example, the illustrated end-user computing devices 150 may each have one or more hardware CPU processors 151, I/O hardware components 152 such as a display device 153 and other components 156, storage 154, and memory 157. In the illustrated embodiment, a Web browser program 160 is executing in memory 157, along with one or more optional other programs 159 (e.g., corresponding to one or more applications), and the storage 154 may optionally include environment information local to the end-user computing device and/or its user, such as physical objects with which the user and/or end-user computing device may interact. In other embodiments, some or all end-user computing devices may execute one or more other types of software applications to participate in the ESVIE system and/or interact with other users, such as if the end-user computing device is a smart phone or other mobile computer (e.g., tablet, laptop, etc.) and the software application is an app executing on the device.

The ESVIE system 140 may create and/or use various information during operation, such as information 121-129 of FIG. 1, which may be stored on storage 120 and/or on one or more remote storage systems (not shown)—the information may include user data 121 about users of the end-user computing devices 150, session and environment data 123 about communication sessions provided and managed by the system 140, predefined and user-defined layer data 125 and 127 regarding types of functionality that may be selectively and dynamically added to interactive communication sessions, predefined and user-defined virtual object data 126 and 128 regarding virtual objects with associated types of functionality that may be selectively and dynamically added to interactive communication sessions, and data 129 about user devices and physical objects involved in interactive communication sessions. The system 140 may include various software instructions that are executed by the server computing system 100, such as to program or otherwise configure the CPU processor(s) 105 to perform particular functionality of the described techniques (e.g., to provide and manage one or more communication sessions involving various of the end-user computing devices). Similarly, the browser 160 (or other software program) may include various software instructions that are executed by each of the devices 150, such as to program or otherwise configure the CPU processor(s) 151 to perform particular functionality of the described techniques (e.g., to participate in one or more communication sessions). During the interactive communication sessions, the server computing system 100 and/or end-user computing devices 150 may interact with one or more communication-enabled physical objects 170 that are optionally present (e.g., to gather information from and/or control operations of the objects), and/or with one or more other computing system 190 (e.g., to provide additional information and/or functionality for use in one or more interactive communication sessions).

It will be appreciated that systems and devices 100, 150, 170 and 190 are merely illustrative and are not intended to limit the scope of the present invention. The systems and/or devices may instead each include multiple interacting computing systems or devices, and may be connected to other devices that are not illustrated, including through one or more networks such as the Internet, via the Web, or via private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, digital music player devices, handheld gaming devices, PDAs, wireless phones, pagers, electronic organizers, Internet appliances, television-based systems (e.g., using set-top boxes and/or personal/digital video recorders), and various other consumer or business products that include appropriate communication capabilities. In addition, the functionality provided by the illustrated system 140 may in some embodiments be distributed in various modules and/or components. Similarly, in some embodiments, some of the illustrated functionality of the system 140 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., the ESVIE system and/or end-user client device software) and/or data structures, such as by execution of software instructions of the one or more software programs and/or by storage of such software instructions and/or data structures. Furthermore, in some embodiments, some or all of the systems and/or modules and/or components may be implemented or provided in other manners, such as by consisting of one or more means that are implemented at least partially in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 3A:
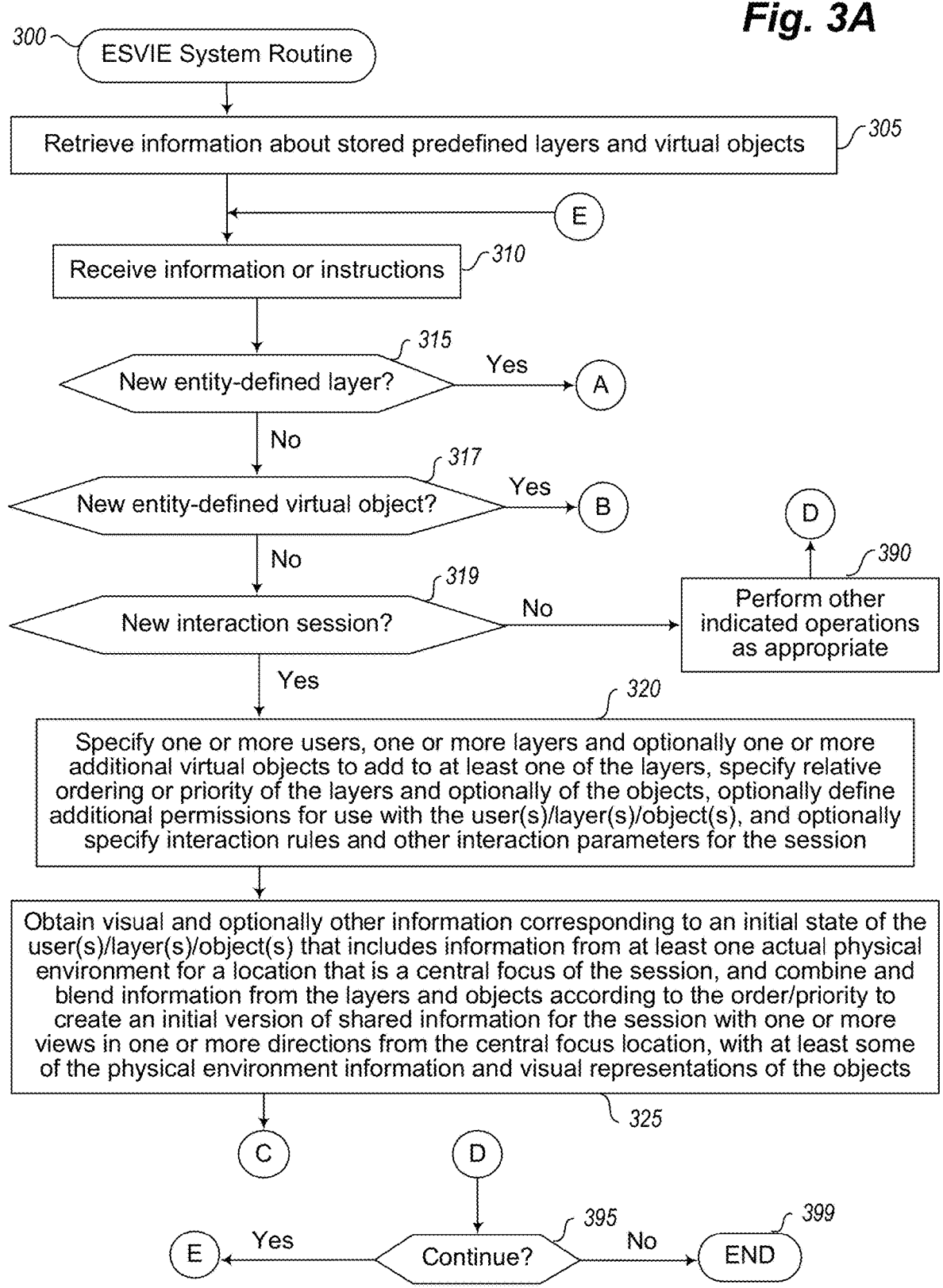
FIGS. 3A-3C are a flow diagram of an example embodiment of the ESVIE system routine.
Figure 3B:
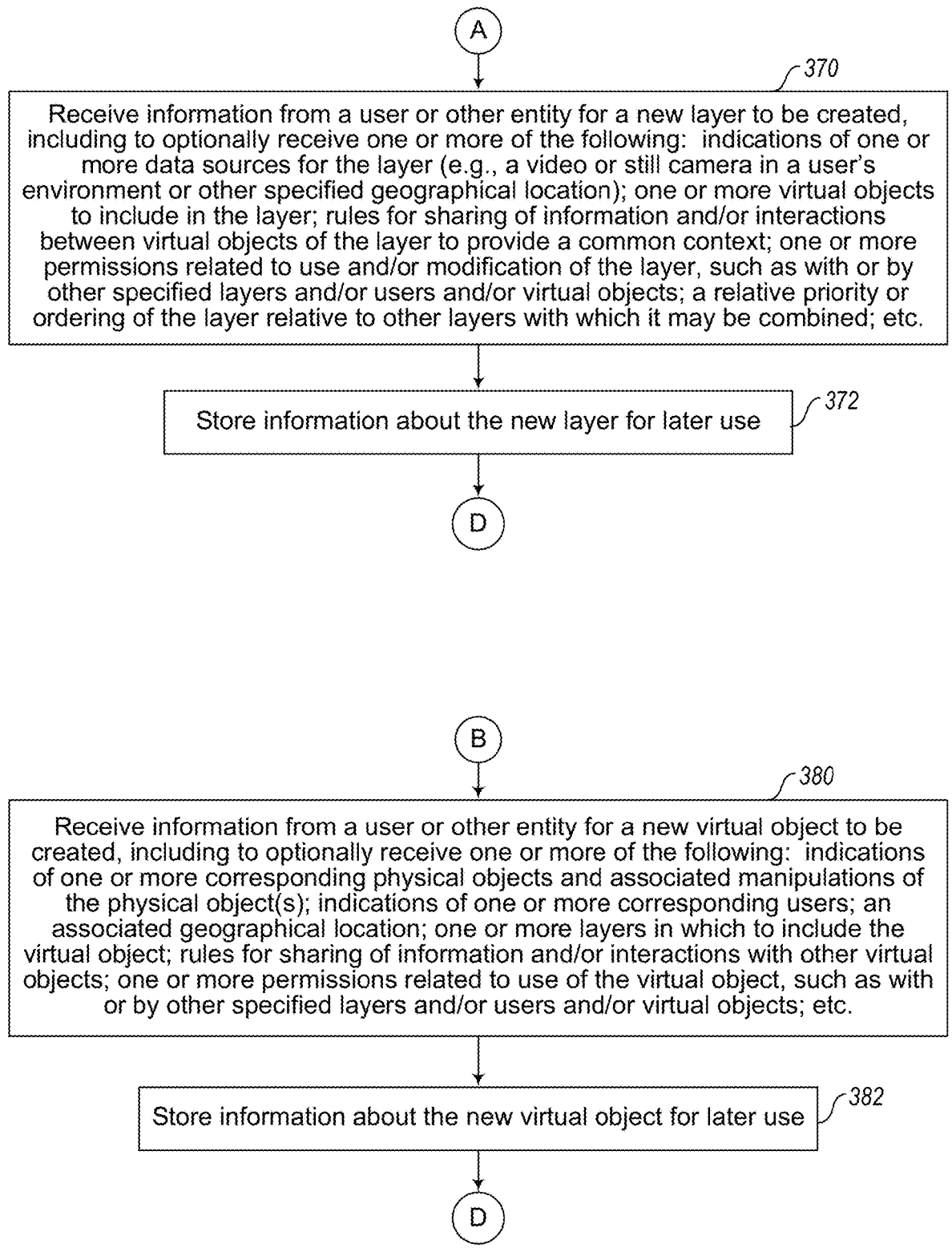
Figure 3C:
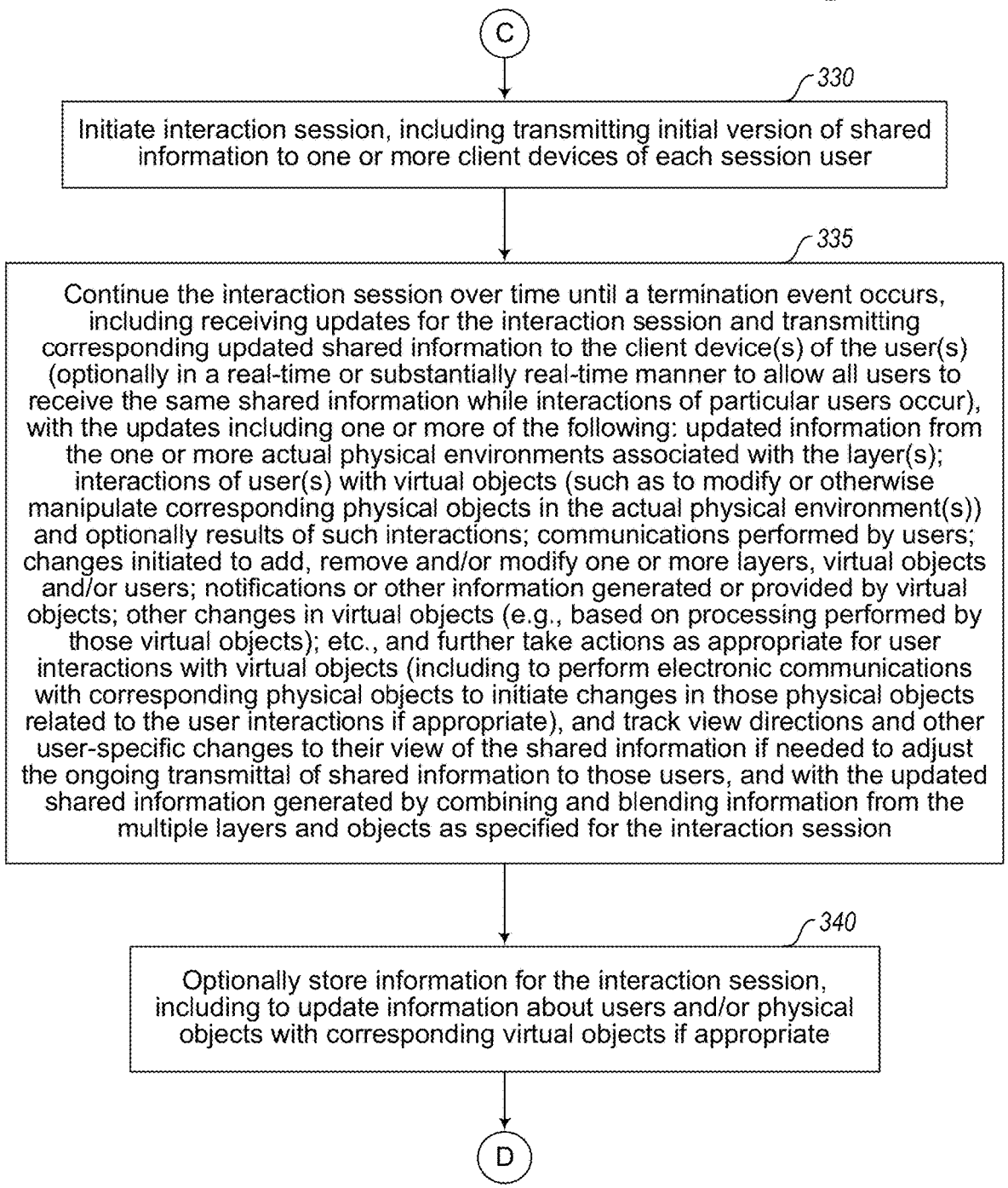

FIGS. 3A-3C are a flow diagram of an example embodiment of the ESVIE system routine 300. The routine may be provided by, for example, execution of the ESVIE system 140 of FIG. 1 and/or the ESVIE system described with respect to FIGS. 2-1 to 2-10 and elsewhere herein, including to create and manage multi-layer interaction sessions involving users and virtual objects situated on corresponding layers and in some cases in specific real world locations (e.g., to correspond to real world objects and/or users).

While actions of a user's client device is not illustrated in these figures, it will be appreciated that the client device may perform corresponding actions, including to receive shared visual information transmitted from the ESVIE system for an interaction session and display or otherwise present the shared information to the user, receive indications of user interactions with displayed information of the interaction session and other user-initiated communications and actions for the session and send corresponding information to the ESVIE system, optionally define new layers and/or virtual objects for later use in one or more interaction sessions, optionally perform other interactions with the ESVIE system on behalf of the user (e.g., to manage an account of the user with the ESVIE system), etc.

In the illustrated embodiment, the routine 300 begins at block 305, where it retrieves information about stored predefined layers and virtual objects that are available for use in subsequent interaction sessions. The routine then continues to block 310 to receive information or instructions, and in block 315 determines if the received information or instructions is an instruction from a user or other entity (e.g., company, organization, group, etc.) to define a new layer for later use. If so, the routine continues to block 370 to receive information from the user or other entity for the new layer, and in block 372 proceeds to store information about the new layer for later use. The information received in block 370 and stored in block 372 may have various forms in various embodiments, as discussed in greater detail elsewhere herein, including in the illustrated embodiment to include one or more of the following: indications of one or more data sources that provide visual and/or other information to include in the layer (e.g., a video or still camera in a particular user's environment and/or at a particular geographical location); indications of one or more existing virtual objects to include in the layer; rules or other controls related to how virtual objects within the layer may interact and/or share information, such as to access and use common information and/or functionality available from the layer (e.g., so that the virtual objects share a common context of the layer); one or more permissions related to use and/or modification of the layer, such as which users can access the layer (e.g., include it in their interaction session) or add virtual objects to the layer or otherwise modify the layer; a priority or ordering for the layer, such as relative to other layers with which the layer may be combined; a name or other identifier; etc.

If it is instead determined in block 315 that the information or instructions received in block 310 are not to define a new layer, the routine continues instead to block 317 to determine if the information or instructions received in block 310 are an instruction from a user or other entity to define a new virtual object for later use. If so, the routine continues to block 380 to receive information from the user or other entity for the new virtual object, and in block 382 proceeds to store information about the new virtual object for later use. The information received in block 380 and stored in block 382 may have various forms in various embodiments, as discussed in greater detail elsewhere herein, including in the illustrated embodiment to include one or more of the following: indications of one or more real world physical objects and/or users that the virtual object represents, including to optionally receive information about types of allowed manipulations of the virtual object (e.g., to correspond to possible changes that may be performed to a corresponding physical object); indications of one or more existing layers in which to include the virtual object; one or more associated geographical locations for the virtual object; one or more permissions related to use and/or modification of the virtual object, such as which users can use the virtual object (e.g., include it in their interaction session), which layers the virtual object can be used with, which other virtual objects it can interact with, etc.; rules or other controls related to how the virtual object interacts with or otherwise shares information with other virtual objects, such as for other virtual objects in the same layer; etc.

If it is instead determined in block 317 that the information or instructions received in block 310 are not to define a new virtual object, the routine continues instead to block 319 to determine if the information or instructions received in block 310 are to start a new interaction session. If so, the routine continues to perform blocks 320-340 to start and continue the interaction session over a period of time, such as until one or more users (e.g., all users, an initiating primary user, etc.) in the interaction session indicate to terminate the interaction session, or another type of termination event occurs. While the illustrated embodiment of FIGS. 3A-3C has a single interaction session occurring at a single time, it will be appreciated that one or more instantiations of the routine may simultaneously support multiple ongoing interaction sessions.

In block 320, the routine begins the indicated interaction session by receiving information (e.g., from one or more users who will be participants in the interaction session) about the setup for the interaction session, including who are the one or more user participants, one or more layers to include and optionally relative ordering or priority information for multiple such layers (e.g., if such ordering or priority information is not previously defined), session-specific permissions to use with respect to one or more of the specified users, layers and/or virtual objects (e.g., to be used in addition to or instead of any existing permissions specified for the users, layers and/or virtual objects), session-specific interaction rules (e.g., between the users and/or virtual objects) and/or other session parameters (e.g., a length of the session, user and/or real-world object and/or real-world geographical location to be a central focus of interaction session, optionally with corresponding video or other information used as a background layer on which other information is overlaid), etc.

In block 325, the routine then generates initial shared information to use in starting the interaction session, such as retrieving or otherwise obtaining visual information and/or other information corresponding to an initial state of the layer(s) and/or virtual object(s) and/or user(s) in the interaction session, including in at least some embodiments to obtain visual information from a real world location to serve as a central focus for the interaction session. Information may then be combined and blended from multiple layers and/or virtual objects for the interaction session, such as by using the relative priority and/or ordering information, and so as to generate one or more views in one or more directions from the central focus locations and to include visual indications of at least one such physical environment and visual representations of one or more virtual objects. The generation of the shared information may further be performed in accordance with and to enforce any corresponding specified permissions, interaction rules and/or other session parameters.

After block 325, the routine continues to block 330 to initiate the interaction session, including transmitting information to one or more client devices of each of the users that includes some or all of the initial shared information, for display or other presentation to the user(s) of each client device.

As indicated in block 335, the routine then continues the interaction session over time until a termination event occurs (e.g., an end time is reached, all users leave the session, etc.), such as to repeatedly update the shared information for the interaction session and to send updated shared information to the client device(s) of the user(s) for display or other presentation to those users, optionally in a real-time manner or substantially real-time manner (e.g., with the updated information being sent with a defined number of millisecond, seconds, minutes, etc. of the actual occurrence). Such updates may occur for various reasons, such as new information being received from a physical environment, interactions of one or more users with virtual objects and/or each other in the session, changes to the structure of the interaction session (e.g., dynamic adding, removing and/or modifying of layers, virtual objects and/or participant users, etc.). When user interactions with virtual objects trigger corresponding changes to real world objects, the system may further perform electronic communications with those real world objects or controller devices for them to cause the changes to occur. In addition, the generation of the updated shared information may further be performed in accordance with and to enforce any corresponding specified permissions, interaction rules and/or other session parameters. Furthermore, in at least some embodiments, an interaction session may include multiple possible views, and different users may change their views over time so as to have different views at the same time—in some such embodiments, each user's client devices will receive all of the generated updated information for all such views, while in other such embodiments the system may track the current views for some or all such users and only transmit the corresponding generated updated shared information for a user's current view(s). Additional details are included elsewhere herein related to the generation of shared visual information and other shared information for an interaction session.

After the interaction session, the routine continues to block 340 to optionally store information based on the interaction session, such as to update information about the users in the interaction session and any physical objects having corresponding virtual objects in the interaction session, including to optionally return any physical objects that were changed during the interaction session back to their initial state. The routine may similarly store such information while the interaction session is ongoing, such as with respect to block 335.

If it is instead determined in block 319 that the information or instructions received in block 310 are not to start a new interaction session, the routine continues instead to block 390 to perform one or more other indicated operations as appropriate. Such other operations may include, for example, receiving and storing other types of information for later use (e.g., information about users, real-world physical objects, real-world physical locations and environments, etc.), performing administrative functions to create and manage accounts of users of the system, etc.

After blocks 340, 372, 382 or 390, the routine continues to block 395 to determine whether to continue, such as until an explicit indication to terminate is received. If it is determined to continue, the routine returns to block 310, and otherwise continues to block 399 and ends.

For illustrative purposes, some example embodiments are described below in which particular types of functionality for shared visual interaction environments between multiple client computing devices are discussed in particular manners. These examples are provided for illustrative purposes and are simplified for the sake of brevity, and include various example details, and the inventive techniques can be used in a wide variety of other situations that lack some or all such details, some of which are discussed below.

In at least some embodiments, the ESVIE system provides an engine that manages multidimensional communication sessions, each having a customizable "virtual world" with multiple layers each having associated functionality available to participants in that communication session. For example, one person may initiate such a session, to which other participants are invited to join, with the various participants benefiting from a multidimensional, enhanced/augmented, real-time firsthand collaboration, and with the ESVIE system creating and managing the "virtual world" that enables the additional functionality provided for the session.

In addition, various terms may be used herein with respect to at least some of the disclosed embodiments and described techniques, including the following:

(1) Point Of Immersion (POI)—The intersection of the dimensional stack and the participant. This is the point at which the participant interacts with the dimensional stack and other participants through various interaction modalities.

(2) Dimensional Layer—A single form of information, presented over the continuum, in a session. Examples include video, audio, drawing, AR, etc., and may represent a shared 'context' for virtual objects on that layer, such as to allow the virtual objects to interact with each other or otherwise share information (e.g., by default, unless other access permissions are defined for the layer or for particular virtual objects).

(3) Dimensional Stack—The summation of dimensional layers stacked to present a unified point of immersion for the session participant.

(4) Participant—An individual or agent who engages with a point of immersion.

(5) Continuum—The metaphorical real-time "bus" over which all content for the dimensional layers is communicated between session participants (6) Session—An interactive engagement by two or more participants, on a common continuum all containing points of immersion.

(7) Interaction Modality—A physical or virtual mechanism by which a participant interacts with the point of immersion. Examples may include a mouse, finger on a tablet, voice, IR based hand detection, eye tracking, presence detection.

(8) Augmented World—A visual, audio, tactile, and sensory representation of computer generated artifacts of real world and artificial entities. Presented to the participant in real world spatial coordinates.

(9) Focal Participant—the world view from the participant who is focus of the session.

(10) Context Mechanism—A representation of the participant's or agent's understanding of the relationships between the entities in the environment. A representation of the state of the system relative to the participant.

(11) Agent—a computer program that acts for a participant or other program in a relationship of agency with the participant. Agents can respond autonomously, at the behest of participants, to provide specialized functionality.

(12) Object Behavioral Characteristics—The responses of objects to stimulus from their world. This stimulus may include interaction with participants, other objects, or physical objects in the real world.

(13) Modality—The classification of a single independent channel of sensory interaction between a computer and a human. Examples include a mouse, digital pen, eye tracker.

(14) Augmented Reality—The integration of digital information with the participant's perceived environment in real time. The superimposition of digital artifacts that represent real-world physical objects or artificial objects.

(15) Virtual (or Artificial) Object—An object implemented in a layer that implements at least one defined type of functionality and/or represents at least one corresponding real-world physical object, such as to have a visual appearance in that layer and to in some cases provide 'intelligent' actions by interacting with other virtual objects on the same layer (e.g., as part of a shared 'context' for the layer) or other layers and/or by interacting with a corresponding real-world object (e.g., to control actions of that real-world object in the actual physical environment). Thus, a virtual object may be instantiated in a peer session dimensional layer, and optionally provide one or more of the following non-exclusive list: the ability to communicate with peer instances (create communication data channels); the ability to interact with the users in a communication session; the ability to interact with other objects in the communication session; the ability to sense the presence of other such objects; the ability to sense when and where they are in a user field of view; the ability to interact with external systems (e.g., databases, IOT systems, via APIs, etc.); the ability to be contextually aware to other virtual objects and users; etc. Some such virtual objects may further incorporate or provide location-related functionality in at least some embodiments, such as to optionally further provide one or more of the following non-exclusive list: the ability to create geo-spatial-temporal objects in dimensional layers, such as to be associated with one or more particular geographical locations (e.g., in a real-world environment); to exist in real world geo-coordinate systems; to be aware of their geo-temporal location and/or their location relative to a user; to sense the presence of users and/or other virtual objects relative to their location; to sense when a nearby user is looking at them; etc.

The ESVIE system may, in at least some embodiments, be implemented as a cloud-based, extensible, multi-user platform that provides real-time remote interaction and vicarious experience between multiple users participating in a shared session. For example, such a shared session may be used to enable immersive, interactive, multi-party augmented reality, visual and haptic IoT ("Internet of Things") control, shared situational awareness, and multi-dimensional collaborative communication, with an extensible number of dimensions of communication, control, interaction, and experience, and with standard, ubiquitous devices to connect and participate in the shared session.

The ESVIE system may further enable humans to remotely and immersively experience any environment, and to collaboratively interact and communicate with other people, devices, agents, information, objects, environments and ecosystems, both real and virtual, near and far, in a firsthand, real-time, augmented, collaborative, multisensory and mutually immersive way that transcends existing remote communication and interaction techniques.

In at least some embodiments, the ESVIE system provides communication and networking systems and platforms, such as for multi-party remote firsthand experience with collaborative virtual and augmented reality, interactive Internet of Things (IoT), and "metaverse" shared reality.

In addition, the functionality of the ESVIE system may solve various problems with existing technology and provide related benefits. Humans use firsthand experience to be effective in business, to learn, to be entertained, and even to thrive, which has a domino effect that drives many industries, often with geopolitical implications. The business world, for example, uses face-to-face meetings, which in turn drives the airline industry and the need for jet fuel, which in turn has direct effect on international governments and the supply and demand of oil. Yet these international implications exist only because current methods of communication and interaction are limited in dimension. If technology could provide a true firsthand experience, or even a better-than-firsthand "augmented" experience, to multiple parties simultaneously without a prerequisite plane ride, the world would indeed see a positive change with similar domino effects.

Embodiments of the ESVIE system described herein provide corresponding benefits, including as non-exclusive examples, to provide a platform to achieve a firsthand interactive experience, or better-than-firsthand interactive experience, for multiple parties simultaneously, and in real time or near real time, regardless of distance of separation between the parties or from the environments they may wish to experience. As part of doing so, such embodiments enable an extensible number of dimensions of communication and interaction to effectively work in parallel, in particular those which feature augmented reality, virtual reality, Internet of Things, and haptic technologies, and to enable those dimensions to work together in such a way as to allow each to leverage the power of the other. Furthermore, the ability of users or other entities to extensibly add layers and/or virtual objects to a communication session provides a powerful customization capability in which such users/entities can add new capabilities to the ESVIE system and such a communication session while benefiting from the underlying communication and control infrastructure provided by predefined layers and virtual objects and more generally by the ESVIE system. At the intersection of AR, VR, and IoT is a truly "immersive" experience, and fusing these technologies together with the Internet creates a beneficial platform for "immersive web".

Consider an example use of customizable layers and virtual objects in a particular interaction session involving one or more users, as follows:

You order a pizza delivery to your home, and place a 3D virtual object outside your front door in an interaction session with the ESVIE system (e.g., in a pizza delivery layer created by the pizza company, or instead in a layer specific to you that you control). The pizza delivery person is also using the ESVIE system, and has the pizza delivery layer loaded for the interaction session—when he or she approaches your home, the pizza delivery layer visible on his/her mobile phone incorporates the 3D virtual object, and as a result there is a five-foot-wide glowing green "Deliver Here" arrow object sitting outside the front door of your house on the mobile phone screen of the delivery person, thus greatly simplifying and reducing the time of his or her job, based on an interaction session between the delivery person and the virtual object placed outside your house.

At the same time, as soon as the delivery person looked at your "Deliver Here" virtual object and/or drove within a specified distance (e.g., one hundred feet) of it, the virtual object senses it is being looked at and immediately sends you a resulting message or text (e.g., "Your pizza is here!"), so by the time the delivery person parks and walks up to your front door, you are opening the door, thus greatly simplifying and reducing your time, based on an interaction session between yourself and the virtual object outside your house.

Such functionality may be implemented, for example, by merely adding one or more virtual objects into a dimensional layer of the system, such as to relate multiple such virtual objects in the same context. In this case, the objects are relatively simple 3D virtual geo-objects that have associated real-world locations and have the capacity to sense and notify, but their interactions via the interaction session of the system allow them to provide significant functionality.

This pizza-delivery example may be further expanded by adding a moving virtual object representing the delivery person and/or his/her vehicle, such as with a location that is updated to real-time location information from a mobile phone of the delivery person or corresponding capabilities integrated in the vehicle. If so, after your virtual object senses the delivery person looking at it or approaching it and sends you a corresponding message, you can pick up your phone (or otherwise access your computing device) and use the same system/dimensional layer to see the location of the delivery person/vehicle. This allows you to effectively look right through your wall and see their location on your street, in 3D, just by looking through the dimensional layer on your phone. Furthermore, as the delivery person/vehicle approaches closer, their virtual object(s) may get bigger, just like in real life. In addition, you could then select the virtual object that represents the delivery person/vehicle and initiate a corresponding face-to-face conversation (e.g., "I'll be right down"). Furthermore, other virtual objects in the pizza delivery layer may provide further relevant functionality, such as a payment or tipping virtual object that you can select to provide corresponding payment.

FIG. 2-1 provides an overview view 200-1 of a participant using the system. This view shows how a participant becomes immersed in the continuum at a point of immersion (P). Once connected to the continuum, a participant is at the center of a sensory "world" that is determined by the various dimensional layers present in the participant's dimensional stack. Conceptually the individual dimensional layers can be thought of as concentric hollow spheres, or spaces with curvilinear extension such as the surface of a sphere, wherein each layer is additive as the radius increases outward from the point of immersion, much like the layers of an onion increase radially outward from its center. Each dimensional layer then surrounds the participant and serves to enable that participant to experience and interact uniquely with a particular dimension of content and perspective. Each spherical layer in the stack can be considered transparent, like glass, or have some varying degree of opacity, or may contain visual objects or other visual elements/representations at any point within itself, but from the perspective of the participant, the dimensional layers fuse together to produce a single real-world experience.

In order to understand dimensional layers it is informative to "unwrap" the concentric sphere model and look at an example of a more linear depiction of the individual layers. FIG. 2-2 shows such a linear depiction 200-2 of the dimensional stack, along with a linear "bus"-style slice of the continuum:

Note how user participant P1 225a is looking in a particular direction through multiple layers L1 220a to Ln 220n in his or her or its dimensional "world", and how user participant P2 225g is similarly looking in a particular direction through the same set of layers L1 220a to Ln 220n). If output from camera C is projected through the continuum onto layer Ln, then both participants P1 and P2 will see this camera's video as the "background" of their view, and any virtual objects displayed in layers L1, L2, etc. will also superimpose on top of the background layer Ln (presuming those layers are otherwise predominantly transparent), resulting in an overall composite experience of layers L1 thru Ln. Thus, layers L1 thru Ln comprise the dimensional stack for each of the participants in this example. Each dimensional layer in the stack represents an information set and accompanying toolset and/or function set. Programmatically, each dimensional layer can therefore be viewed and constructed as its own super-object. These same layers may comprise the dimensional stack of other participants, which results in all participants in a shared visual interaction experience for a communication session having a shared experience. Alternatively, in at least some embodiments and situations, some dimensional layers can be made to be different, or stacked in a different order, for different participants in a shared visual interaction experience for a communication session, yielding either a different experience, or offering different tools and abilities to interact with the objects in the various dimensional layers.

Each individual session defines a particular set of dimensional layers that are to be used by, or available to, participants in that session. These dimensional layers represent a collection of information, as well as methods for portraying that information if so desired, and methods that allow a participant or agent to interact with that information if so desired. The individual information sets may be such that they are unique to, or calculated by, an individual dimensional layer itself, or they may be comprised of any information that is already available in or through the continuum (such as information developed or projected by other dimensional layers, objects, or devices in the continuum), or any combination thereof.

Each dimensional layer represents a content, perspective, and feature set that can be used to produce its own sensory world to envelop the participant. Dimensional layers can be simple (for example they may simply project a video), or they may be complex, containing multiple virtual objects that the participant can interact with. Each dimensional layer can have its own associated toolset to allow the participant to vary the perspective of, and interact with the information and features of, that individual layer.

By default, some number of dimensional layers are generally available to some or all sessions (e.g., sessions of a particular type); as an example, one type of public session for consumer use may include a basic video layer, an audio layer, a "comet-tail" ephemeral drawing layer (wherein lines drawn display only temporarily, with their tails disappearing shortly after being drawn, similar to the way a comet's tail disappears in the sky), a compass or position layer (which enables a participant's position and direction to be broadcast for participants using sensor-enabled devices), a basic augmented reality layer, which enables AR and VR objects to be placed within the real-world three-dimensional space of any participant, and a basic IoT layer, which enables certain Internet of Things devices to become connected to, experienced by, and controlled by, any participant.

Returning to a spherical context, a participant at the center of a dimensional stack can in at least some embodiments see and hear in all directions, spherically, through a multitude of transparent layers, and may see different views or objects depending upon which physical or virtual direction they are looking, just like in the real world. Typically, however, a participant will be viewing only a subsection of the entire sphere, as determined by the physical direction they are looking and the type of sensory interaction device that they are using as a viewer (for example, a large desktop monitor will traditionally have a wider viewing angle and/or more available pixels than the screen of a smartphone; however some VR headsets are an order of magnitude beyond even large desktop monitors). Each dimensional layer may be projecting different information or sound, and that information can be anywhere within the three-dimensional sphere of that particular layer. The fusion of all layers produces the combined real-world and augmented sensory experience.

FIG. 2-3 provides a high-level overview view 200-3 of the system as a whole. The session server (1) provides the mechanism for establishment of the sessions and any peer-to-peer ("P2P") and/or client-server communication infrastructures. Once the P2P sessions are established, some or all of the communication between participants (2) may be conducted in a P2P manner, as in the example embodiment depicted, thereby freeing the session server from the corresponding data transfer and/or processing load. Additionally and/or alternatively, one or more participants can be agents which act as repeaters, bridging the session to more participants without incurring a corresponding multiplicative data and/or processing load on either the session server or other participant devices. The session server also provides the mechanism for communication and interaction with any $3^{rd}$ party servers or systems or devices, which may be useful to the function of $3^{rd}$ party dimensional layers that are "plugged in" to the continuum (3). The session server can be hosted in a variety of ways (e.g., dedicated server farm, cloud-based infrastructure, etc.), using a variety of protocol stacks. In one embodiment, the session server is hosted on an Internet-connected cloud-based infrastructure and establishes communication with participants using the WebRTC protocol stack. A benefit of this embodiment is that the participant computing devices communicate with the session server through TCP/UDP standards-based communication protocols and W3C standards-based browsers, both of which are ubiquitous.

Participants and agents may use various physical devices to establish a point of immersion (POI) in a session continuum in at least some embodiments. The physical devices are characterized by an ability to communicate over one or more networks, by an ability to process and compute, and by an ability to interface with humans and/or the real world. Human interfaces may include those directly integrated with the device (e.g., integrated touch screen), or those connected or tethered as peripherals (e.g., conventional monitor/keyboard/mouse), or those connected or tethered as sensory interaction devices (e.g., wireless VR headset with IR-based hand detection). Real-world interfaces may include any sensor or controller which enables the compute engine to sense, identify, or characterize the ambient environment or any objects therein (e.g., thermostat, gyro, GPS, accelerometer, magnetometer, LIDAR camera, fingerprint swipe, biometric sensor) or to interact with, influence or control the ambient environment or any physical objects therein (e.g., motor controller, heater, RFID controller, bulb, switch, relay, squib, etc.).

There are myriad possible configurations of participant computing devices, including those which are used autonomously by agents rather than humans (e.g., an agent module embedded in, or as part of a home alarm system or home automation system, webcam system using a webcam on a gimbal, automobile, flying drone, etc.). As an example, these participant computing devices may communicate with the session sever via the Internet through TCP/UDP standards-based communication protocols and W3C standards-based browsers, and/or via dedicated IoT networks or network layers and related protocols. Note that the participant computing device itself may optionally include one or more human or real-world interfaces; however, if included, these interfaces may be attached peripherally by any means, including wired or wireless tether (e.g., USB, Bluetooth). When a participant computing device is combined with a human interface and connected to the continuum, a point of immersion is created through which a human can achieve remote experience with any other participant or worlds or objects in the continuum for that session. The greater the sensory and haptic abilities of the human interface, the greater the degree of immersion and first-person experience. Human interfaces which fall into this category are implemented using sensory interaction devices.

Participant computing devices may employ various visual, auditory, tactile, kinesthetic, haptic, or other sensory interaction modalities in order to interface a human with the continuum at the point of immersion. These interaction modalities enable human participants to interact directly with the individual layers within, and experience the combined sensation of, the stack of dimensional layers. Various sensory interaction devices may be used, including those ranging from conventional computer displays with keyboard and mouse, to touch screens, to VR headsets with non-invasive hand and eye trackers, to 3D holographic rendering devices, etc. Such devices may also be of portable and wearable varieties such as Heads-Up Displays (HUDs) and smart watches, goggles or glasses.

In addition to participants, the system may also interact directly with external real world physical devices through the continuum. These interactions can, in at least some embodiments, be bi-directional in that the state of the physical object (e.g., on/off, speed, temperature, color, rotation, configuration, etc.) is communicated by, and represented as, a state of one or more virtual objects within the continuum, and vice versa. External physical objects may therefore communicate directly with the system and its participants through dimensional layers, and system participants and agents may interact directly with, and remotely manipulate the state of, real-world physical objects via their "doppelganger" virtual objects in the continuum. As such, embodiments of the system may fuse augmented reality (AR) and Internet of Things (IoT) and remote experience.

One or more real world physical devices, sensory interaction devices, and participant computing devices may combine to work in concert within a room or designated space to produce a complex environment of physical and virtual objects.

FIG. 2-4 depicts a physical representation 200-4 of the relationship between the three technological stacks in one example embodiment.

The continuum stack in the example embodiment is a framework that enables independent, asynchronous, simultaneous, wide-area, and real-time remote experience sessions to be created. The continuum stack facilitates multiple communication mechanisms and inter-participant communication models including, but not limited to, peer-to-peer (P2P) and conventional client-server. The continuum stack also includes a collection of communications protocols and application programming interfaces that enable real-time communication over peer-to-peer and client-server connections. This allows browsers to not only request resources from external services and back-end servers and databases, but also real-time information from the browsers of other users. The continuum simplifies many transport mechanisms into a single API. Once a session connection between two or more participants is established, data channels within the continuum are established between session participants. In at least some embodiments, the continuum employs an event-based bi-directional communication layer for real-time web applications.

Participants may create, join and leave sessions if the appropriate mechanisms or permissions are established. When a participant enters a session, connectivity is created for that particular session definition given the permission and configuration of the system. Information shared by the participants may be contained in granular dimensional layers which contain a restricted type of data (e.g., video, audio, drawing data). These dimensional layers may be constructed in the browser using web standard HTML elements which are stacked to provide the participant with a multi-dimensional view if the information space. As the session participants employ the tools specific to the dimensional layers (e.g., drawing, manipulating AR objects, etc.) the change in state of the information generated by the tools is shared, such as in real-time amongst all session participants over the shared session continuum. Thus, communication modalities can be shared by all participants through the point of immersion.

The continuum session initiator can invite any other participant to join the continuum simply by providing them with a specific Universal Resource Locator ("URL"). The other participants may join and are provided with a point of immersion and access to some or all of the same tools as the session initiator. Participants can join, mute or leave the continuum at will provided they have the correct access credential.

Sessions, dimensional layers and participants can be restricted based on business models that dictate access to agents, data and functionality. The ability to add participants to a session can be restricted to a finite set of authorized participants based on a back end authorization system. Once participants are added, access to specific dimensional layers can be granted or limited based on permission of individual participants to access information. Furthermore, session creation can be granted or limited bases on business rules or the permissions granted by the entity controlling the session server(s).

In this way, organizations can structure participation and information access by users based on business models. For example, an organization may have different business units which access specific information, and individual participants within these units may or may not have permission to access specific tools and/or types of information. Rules governing the creation of sessions, dimensional layers and participants can be controlled at any level of granularity.

Each dimensional layer within the stack may be shared with participants using the P2P communication model and any state change to a participant's dimensional layer may be communicated in real-time to the same dimensional layer for other participants, either through the session server or via P2P; thus participants may share state for a given dimensional layer. Dimensional layers are represented as complex objects, and may contain the following functionality. The dimensional layer object can explicitly define data and information types. Dimensional layers may have defined data and information types (e.g., video with a CODEC, object geo-location data). In this way, methods for parsing and reacting to data transmitted over the continuum are aware of the data. The dimensional layer object may subscribe to a real-time P2P data channel. Distributed participant dimensional layers may communicate over the continuum using real-time P2P and/or client-server communication protocols. In this way, all participant data can be communicated synchronously to participants. When dimensional layers are created for participants, they subscribe to a data channel for that particular dimensional layer. Dimensional layers are aware of the appropriate data channel creation methods and data to be communicated. The dimensional layer object is capable of understanding and parsing information over its P2P or client-server data channel. Dimensional layers are aware of the data and information types communicated over the continuum. They are able to parse the message traffic and pass the information to the appropriate object methods. In this way, dimensional layers are aware of how to communicate with other participant dimensional layers over the continuum. For example, the AR video view of the world may change due to a positional change of the tablet device of a participant. Sensor data from the device will be communicated to the dimensional layer of participants in the session in real-time, and the data will be parsed and passed to the methods for changing the rendering of the AR world in the participants' dimensional layer. The dimensional layer object can establish focus and peer relationships with participants. Dimensional layers may occasionally establish focus and peer relationships, to allow a focus participant to "drive" the presentation of information. Focus and peer relationships are orchestrated through a context mechanism where each participant is in either a focus or peer relationship with other participants. When a change in this relationship is established or changed, information is passed to the dimensional layer over the continuum to inform the dimensional layer object. FIG. 2-5 illustrates an example 200-5 of a dimensional layer object interacting with its own and other participants' context mechanism.

In at least some embodiments of the ESVIE system, all session participants have a context object. The context object maintains information as to the state and the relationship of the participant, its dimensional layers, physical devices, interaction modalities, etc. A participant's context object is capable of communication with other participant's context objects, either by informing other participants of context change or by a participant requesting information about another participant's context. This allows for the system to maintain a shared context without having to be maintained by a central server; the shared context can therefore be self-organizing.

In at least some embodiments of the ESVIE system, the dimensional layer object has the ability to "render" the data and information over the P2P or client-server data channel, for the information and data that is specific to that dimensional layer. Object methods for the dimensional layers are aware of data types communicated over the continuum and are capable of rendering that particular information type.

The dimensional layer object contains the user interaction modalities to manipulate the data and information associated with the dimensional layer object. Dimensional layers may contain participant interaction modalities such as UI ("user interface") components on a tablet or more complex mechanisms such as non-invasive hand trackers. There interaction mechanisms are aware of the data types for that dimensional layer and the interaction mechanisms are specific for interacting with the appropriate data type. Many times the result of an interaction event is a state change in a dimensional layer object that results in a communication event over the continuum to other session participants. An example of this may be a participant drawing a line with a finger on a tablet device in a drawing dimensional layer. That drawing event would render the line on that participants display and also communicate to other participants to trigger a rendering event. FIG. 2-6 illustrates example details 200-6 regarding such interactions.

In at least some embodiments of the ESVIE system, dimensional layers of an explicit type can be created by participants with sufficient permission and authorization, and shared with other session participants based on permission and authorization. A dimensional layer of a particular type (e.g., drawing, AR, etc.) may be instantiated by a participant locally, such that only that participant has the functionality. The participant my also share that dimensional layer with some or all other session participants. Once sharing is accomplished, the participants have common functionality. Dimensional layers can be created and will persist in the session until explicitly removed by the initiating user or by another participant with sufficient permissions and authorization. Sessions, dimensional layers and participants can be added and removed based on permissions and authorizations. These permissions and authorizations are based on the business rules of the organization in control of the particular session server instance, sometimes referred to as a "core" instance. Sessions, dimensional layers and participants persist in the continuum until they are explicitly remove by an agent with appropriate permission and authorization. Dimensional layers may interact with other dimensional layers in the dimensional stack. In this way objects in different dimensional layers can "react" to state changes in objects based on influences such as user interaction and sensor input. Dimensional layers may interact with other dimensional layers by communication between objects within the dimensional layers. Object integration is achieved through message passing between objects addresses to a specific dimensional layer. Objects in dimensional layers may interact with and other web based infrastructure through API's that are germane to the dimensional layer.

In at least some embodiments of the ESVIE system, data for the dimensional layers exists on the continuum through a P2P communication model, and dimensional layers, in addition to external services, can access the data provided permissions and authentication. Additionally, metadata is maintained through the context mechanism for the data, communication, and interaction modalities available to the Particular dimensional layer. Through this mechanism, an external service may subscribe to an object in a dimensional layer, and when there is a particular event on that object, it can react appropriately and communicate the response back to a dimensional layer. The API mechanism provides mechanisms for the external service to access information in a dimensional layer over the continuum, react to that information and respond back to the dimensional layer.

Within a session, each participant object may contain a context mechanism which manages the state of the relationship between the participant, other participants, interaction and visualization modalities, and the system as a whole. The explicit representation of context assists the functioning of the complex interaction between participants. The context for a participant represents information such as the dimensional stack and POI, available interaction modalities, other session participants, the physical capabilities of the devices being used, spatio-temporal information of participant devices, participant states, roles and responsibilities and current interaction state. Participant context is represented locally for participants as an object; however, contextual information can be shared with other participants and the system as a whole. For example, if there is a transition from one participant being the focus to another, the participants' context would be changed to reflect the transition. Additionally, if there are changes in physical properties or capabilities of the participants' devices, this may be communicated to other participants. For example, a participant may change their physical location and therefor their location context. This would be communicated to other participants.

As one specific embodiment, the core functional infrastructure of the ESVIE system will be described through the application of several simple core components that provide functionality for a multi-user collaborative infrastructure. The following illustrates the use of several dimensional layers for shared collaborative drawing. As a session participant draws on the drawing dimensional layer using a drawing device (e.g., mouse, finger on tablet, animated hand through a sensor based hand detection modality), a user-specific color-coded line is drawn on all participants' screens in real-time. The line then has a time-based decay, providing an ephemeral "comet tail" effect in which the line does not persist. Session participants can collaboratively draw on the layer, and they simultaneously see the drawing at the point of immersion. Session participants also have the ability to turn the comet tail effect off, such that the participant drawings persist. While this is an exemplar of basic drawing, drawing functions with additional domain-specific functionality may also be provided and used, such as for Computer Aided Design (CAD) of artistic drawing functions. Since this drawing is taking place in the dimensional stack that is shared by participants through the continuum, the shared context of session participants is established. Participants are thus participating in a shared collaborative interaction where the context of the interaction is understood by the participants. This shared context is beneficial for complex interaction between multiple participants using complex information types.

As another specific embodiment, and building on the core concepts of the prior embodiment above, this additional embodiment introduces the concept on additive functionality using the dimensional layer infrastructure. In this embodiment, the concept of a shared augmented world is introduced. Given a spatially aware device (e.g., tablet with GPS, orientation sensors), the geo-spatial context of the focus participant can be shared with other participants. In this way, all participants can share the focus participant's perspective through the POI. Augmented objects may be used to represent real world physical entities (e.g., light switch, car, building) or synthetic entities (a 3D animation of a machine part assembly), and are placed in the augmented world. These augmented objects exist in real-world geo-spatial coordinates and are shared with session participants through the continuum. As the focus participant moves through space (x, y, z, roll, pitch, yaw), the session participants view a common real and augmented world, thus participating in the focus participant's view of the augmented world as this participant experiences it. Augmented objects can be interacted with and have agent-based functionality. Interaction with the augmented objects is dictated by their unique behavior. For example, an object may be selectable and, upon selection, invoke a particular behavior that is experienced by all session participants. Augmented objects may be created and placed in the augmented world by session participants for all to share. FIG. 2-7 illustrates example details 200-7 of an architecture for sharing an AR world. In addition, while some example embodiments are discussed herein in which a single user is the focus participant at a given time, in other embodiments multiple users in a single interactive communication session may simultaneously be focus participants, such as to provide information from all such focus participants to the other participants (e.g., by overlaying information from multiple focus participants, by displaying information from different focus participants in different windows or other display areas, etc.).

In the shared AR dimensional layer, there are two types of participants in at least some embodiments, including the focus participant whose world is being shared, and peer participants who are immersed in the focus participant's shared world. Participants in a session with an AR dimensional layer share a common AR "world" model that is loaded into each participant's AR dimensional layer. The nature of the dynamically loaded AR world is dictated by the parameters, such as geo-location of the focus participant and the AR world's interactions with the participants for a particular session. At any time, the focus participant may be changed, with session participants now experiencing that participant's world view with augmented object's that are specific to the geo-location of the focus participant. Session participants may also have augmented objects that are unique to them. In this way, session participants not only are immersed in augmented objects at the focal participant's geo-location, but also specific to that participant. The AR world also consists of the functional AR objects. These objects are representations of real-world physical entities such as cameras that are appropriately set for either the focus or peer participants. FIG. 2-8 illustrates examples 200-8 of functional AR objects.

For example, the focus participant AR camera is driven by the device sensors, and the peer AR camera is driven by the focus sensor broadcast on the data channel of the AR dimensional layer over the continuum. Thus, the peers share the focus view of the AR world. FIG. 2-9 presents a high-level example geometry 200-9 of such an AR world. In this scene, the camera is 'looking' in a particular direction with a specific orientation. As the AR camera (and the actual sensor-based camera) changes orientation, so does the view into the AR world. For the focus participant (usually the dimensional layer initiator), the AR camera orientation is driven by the device sensors (gyro and magnetic), while the peer participants share the scene through the real-time broadcast of the same sensor data on the dimensional layer data channel. The only difference between the focus and peer AR camera "gimbal" drivers in this example is if they are listening to the device sensor data or the broadcast data. The baseline AR world is loaded at the initiation of the AR dimensional layer. At this time, the core AR objects are loaded into the world. As the session progresses, objects are moved, added, deleted, etc., as dictated by the participants' interactions with the objects. There is a virtual sensor-DrivenCamera for the focus participant, and a broadcast-DrivenCamera for the peer participants. For the focus participant, the virtual camera is positioned at the equivalent of the physical camera. The AR virtual camera is driven in virtual space by a virtual gimbal mechanism, similar to a "neck" on a real camera. The sensorDrivenCamera (the focus) is "attached" to a function DeviceOrientationControls which rotates the virtual camera based on the mobile device gyros (roll, pitch, yaw) and magnetic orientation. In this way, the AR camera tracks the virtual world as the device moves. While there is an apparent effect of the relationship between the actual, video world and the AR world, in reality the only relationship between the actual world and the AR world is the construction of the AR world as it relates to the physical world. For example, an AR object is placed in AR space at a certain location relative to the AR world origin. The broadcastDrivenCamera (the peers' AR camera) is attached to the BroadcastOrientationControls function, which listens to dimensional layer data messages from the sensorDrivenCameras DeviceOrientationControls that move it as a function of the "peer" participant's orientation of the device. In this way, the peers see the same AR world as the focus participant POI, and the peer view of the AR world is driven by the focus participant's view of the world. AR objects share state data between participants. State is anything that dictates the information related to an object at a point in time. In the 3D world, there can be hundreds of pieces of data attached to an object to dictate its state. This information may be anything from simple 3D location data all the way to complex behavioral physics models.

In order to implement a real-time AR interaction environment, several data interaction models are implemented in at least some embodiments. There is a continuum of possibilities for rendering the object dynamics on the peer participants' browsers. In each one of these instances, the appropriate data exchange mechanisms, parser implementation and object method invocation are provided and used. We assume for the purpose of this example description that the focus participant initiates the dynamics of the object.

- Simple single state communication. Communication of a simple discrete state change such as location, rotation and material color. There is simply a one-time state change data transmission and the receiver acts on it once.
- Real-time continuous state change. This is similar to a draw activity. State change is broadcast continuously and the receiver is continuously updating the state. This could simply be the previous solution, broadcast at a high frame rate. When there are many objects moving, a determination is made when to start/stop broadcasting. This mode could involve initiation of the dynamics by a user interaction (touch), an object collision, etc., and could also be initiated by object listeners.
- Dynamic model method attached to the shared object (shared in all models). In this mode, there is an actual dynamics behavior model attached as a method to an object. In this way, the session participants share an object with a common behavior model that can be invoked by a broadcast message. A simple example of this may be a ball that has a simple "bounce" physics model attached and can be invoked by a user interaction, broadcast message or even a collision. An advantage of this method may be the ability to pass parameters and have multiple behavior methods attached to the same object.

As another specific embodiment, and continuing with the prior embodiment above involving a shared augmented world, the functionality and shared collaborative augmented world concept is expanded in this embodiment through the addition of functionality to provide for the participants (or agents) to interact with and control the physical world. Given a contextual layer that contains augmented objects representing real world physical objects and artificial objects, the session participants can interact with these objects through a myriad of interaction modalities. Objects can have a degree of autonomy and functionality based on their behavioral characteristics in this embodiment, and virtual objects can interact with participants, other objects and their physical manifestation in the real world. One manifestation of this is the use of a non-invasive hand/arm tracking sensor, whereby the participant can place their hand in three-dimensional space and have the spatial representation of the hands rendered in the continuum. This representation can, for example, take on the rendering characteristics of anything from a basic skeletal representation to a fully draped realistic hand/arm representation. Since the representation of the hand exists in the augmented world of the participants, the sensed hand can interact with augmented objects. This interaction can include the creation and manipulation of objects. For example, the hand representation may "grasp" a physical object, move it in its virtual physical space and manipulate it to change its virtual physical characteristics. FIG. 2-10 depicts such an embodiment 200-10.

As further description of example embodiments, some embodiments of the ESVIE system provide a browser-based multiuser augmented reality, virtual reality, and Internet of Things platform that is extensible, real-time, and collaborative. This can enable real-time or near-real-time interactive collaboration and vicarious experience within an immersive multi-party AR/VR ecosystem that is available for both business and entertainment use, is independent of distance of physical separation between participants, and uses only standard, ubiquitous devices for people to connect and participate.

Some embodiments of the ESVIE system enable humans to remotely and immersively experience any event or environment, and to collaboratively interact and communicate with other people, devices, agents, information, objects, environments and ecosystems, both real and virtual, near and far, in a firsthand, real-time, augmented, collaborative, multisensory and mutually immersive way that transcends existing remote communication and interaction techniques.

Some embodiments of the ESVIE system provide a platform with a multidimensional layered architecture specifically designed to enable AR, VR, and IoT to be brought together with ease, in order to allow each to leverage the power of the other, and to provide an infrastructure upon which third parties can quickly build augmented, visually-oriented, and media-rich solutions to real-world problems that can be immediately deployed to, and embraced by, existing mainstream business and consumer industries.

Some embodiments of the ESVIE system provide an open platform that is both extensible and device agnostic, with a dynamic, layered, plug-in architecture that engenders browser-based third-party developer applications, and using standard, ubiquitous web-enabled devices (e.g., smartphone, tablet, laptop) to connect.

Some embodiments of the ESVIE system are entirely browser-based, with no special software to load, and no apps or plug-ins required for use. Sessions are initiated merely by visiting an affiliated web page from any web-enabled device; therefore such embodiments are readily accessible to anyone.

Some embodiments of the ESVIE system provide functionality for real-world use, not just virtual entertainment. While games can be implemented on this platform, this platform is about enabling augmented communication and interaction for everyone, including augmented interaction not only with other people but also with real-world objects, automated agents, and other systems.

Some embodiments of the ESVIE system are multi-party interactive and collaborative. Most AR and VR systems are first-person, meaning they are designed for a single user. In contrast, such embodiments involve two or more users, who can all be interacting in real time.

Some embodiments of the ESVIE system enable remote augmentation. Most AR systems augment only the immediate physical environment of the user. Such embodiments enable a user to remotely and vicariously experience the environment of other users or agents, and to project their own presence into that remote environment. Distance is not a factor; users can be separated thousands of miles from each other or their remote environments.

Some embodiments of the ESVIE system are open and extensible, as a platform upon which 3rd party developers may build AR, VR, and IoT "apps". These "augmented apps" again can be loaded on-demand from the cloud through the browser, without pausing or restarting a session, and without the end-user installing any additional software.

Some embodiments of the ESVIE system are device agnostic, such that a web-enabled device having a web browser may be used. AR-specific and/or VR-specific equipment can also be connected and controlled through the browser in such embodiments, with functionality centrally managed and pulled or pushed from one or more server devices over the Internet and/or other computer networks (e.g., via "the cloud").

Some embodiments of the ESVIE system also enable people to remotely interact with real-world objects and environments in a firsthand multisensory way by enabling IoT interaction with those objects to become virtualized and therefore visual, such that they can be seen and even touched through haptic feedback.

Some embodiments of the ESVIE system provide a platform designed specifically to engender and support an extensible number of dimensions of real-time, interactive, firsthand experience, including augmented dimensions, which is independent of physical separation, and which can even interface and interact with real world objects through the use of IoT. Such embodiments yield an excellent way for the consumer and business markets to embrace IoT by making remote access to IoT objects both visual and interactive, including through actual physical touch with haptics and haptic feedback.

A feature of at least some embodiments of the ESVIE system is that participants may freely engage with it using a plurality of ubiquitous devices without special hardware or software; a connection to the system can be initiated through any supported web browser. Additionally, participants may interact with the system through various interaction modalities (e.g., finger on a touch screen, surround-sound audio, voice command, VR headset, IR-based hand detection, haptic glove or "skin", etc.), each of which may serve to further enrich the participant's immersive experience.

Another feature of at least some embodiments of the ESVIE system is being extensible to accommodate public or private $3^{rd}$-party hardware and software plug-ins (e.g., VR headset, IoT device or device driver, facial-recognition application, company-proprietary workfleet applications, etc.). Such embodiments feature an ability for $3^{rd}$ party developers to readily connect in real-time and immersively engage with participants on the front end, while connecting to their own servers or hardware on the back end, without having to develop complex infrastructure and protocols to support a real-time, remote, multisensory, immersive and interactive experience.

Thus, such embodiments of the ESVIE system provide a multi-participant platform to engender and support 3rd party real-time augmented reality and IoT "apps" or "dimensional apps", with each 3rd party application being a new visual layer (also referred to herein as a "dimensional layer") that can be "plugged in" to any session. A benefit of such embodiments is that such $3^{rd}$ party apps can be loaded and managed by a session server of the ESVIE system, thus providing a mechanism by which to alleviate $3^{rd}$-party software installation by the participant, with a session initiated using only a web browser. $3^{rd}$-party dimensional layers can then be added to the system or any session "on demand" in this way, with each dimensional layer representing a real-time plug-in extension of the system, and with at least some embodiments being limited in the number of such layers only by the number of available layers and computational capacity of the client devices (e.g., memory, CPU cycles, etc.).

Embodiments of the ESVIE system thus provide a multidimensional communications and interaction platform, referred to at times herein as the "continuum", along with discrete dimensions of content and perspective that "plug-in" to that platform, referred to as dimensional layers or layers. These dimensional layers may contain both the information and the methods to enable anyone who engages with the system to experience, and optionally interact with, the content of each layer. The set of dimensional layers available to a participant at any one time is referred to at times herein as the "dimensional stack", and combines to produce the augmented multisensory world into which a participant becomes immersed when engaged with the system. The intersection of the dimensional stack and a participant changes as the participant performs interactions, and is referred to at times herein as the "point of immersion".

Participants connect to the ESVIE system's continuum platform at various points of immersion using various devices and methods. The devices themselves are generally referred to herein as participant computing devices (e.g., smartphone, tablet, desktop), and typically have some form of video, audio, and networking ability (e.g., web-enabled smartphone or tablet, or desktop with camera, microphone and speakers).

One or more participants may engage with the system together in a real-time session. In at least some embodiments, sessions may have unique identifiers (which allow participants to find each other and therefore become immersed together in that particular session, independent of any other sessions which are or may become active), can be public or private, and can be started and stopped at will by the session owner or initiator, his or her designee, or any authorized automated agent. At least some such embodiments support automated and artificially intelligent agents in lieu of one or more participants of a session.

To enable participants to freely join sessions with ubiquitous devices and multiple interaction modalities, several predefined stock dimensional layers may be enabled for a given session. An example of a set of predefined layers would be a background video layer, a basic audio layer, and an ephemeral drawing layer. Other examples of predefined layers include a compass and positioning layer, a basic augmented reality layer, and a basic IoT layer, to support sessions where one or more participants has additional device capabilities such as a GPS or sensor package (gyros, accelerometer, magnetometer, etc.) Most modern smartphones already contain both GPS and sensor packages.

A simple, non-exclusive example of a session follows: A person who is experiencing a unique event may wish to share this experience with other people in real-time. This person therefore initiates a connection to the system's continuum by opening a web browser on their smartphone and visiting a web site affiliated with the session server. On this site they initiate a session. The session will be given a unique name, which they can share with other participants. As soon as they initiate the session, the session server automatically downloads software to their phone via the web browser (if appropriate), and the web browser on their phone then activates the phone's video camera and displays on screen what the video camera on their phone sees (either front- or back-facing camera, at their option); this is the work of the basic video dimensional layer. Thus this "focus" participant can use their cell phone to capture video of the event and project it to other participants, as this video is also being projected in real-time to the continuum. Audio is also being captured from their microphone, by the audio dimensional layer, and similarly broadcast on the continuum. Information in the continuum may optionally be made encrypted and secure in at least some embodiments.

Other participants are invited and connect to the session by similarly opening a web browser on their devices, and visiting the same web site and entering the same session name, and (if private) optionally a password or other multi-factor authentication. These other so-called "peer" participants may be thousands of miles away and apart from each other, but now they are all connected together in the same session in real-time via the continuum, and the dimensional stacks granted to their devices enable them to see and hear the video and audio being broadcast by the focus participant. In addition, their own video and audio is also projected to the continuum, and thus participants, including the focus participant, can see, hear, and interact with each other in real-time, or near real-time, and securely, if so desired.

A feature of at least some embodiments of the ESVIE system is to be able to unite the focus of all participants into a single experience by aligning the dimensional layers in their stacks. For example, the layer containing the video feed of one participant may be used as a background layer for all participants. In this way all participants in the session are viewing the same video "center stage" in their browser window. What each participant sees via their connection to the continuum can be determined by the initiator of the session, or any designated moderator. This is referred to as the focus, and if a particular participant's video feed is showcased to all participants then that participant is referred to as the focus participant, with all other participants being referred to as "peer" participants.

In the aforementioned example, one participant initiates a session and chooses to place their own cell phone video broadcast as center stage for all to see, and then invite the other participants to join the session to "see what I am seeing". As other participants join the session, their own video feeds may appear as smaller video boxes around the periphery of the focus video, or in various sizes, or not at all, depending upon the preferences of the session initiator and/or the individual participant. During the session, the focus may be changed dynamically from one participant to another by the session initiator or any designated moderator.

Furthering the example, with all participants now seeing and hearing each other in real-time, and with all participants now united in focus on the background video being projected from one participant's cell phone, other dimensional layers can now be used to enrich and augment the experience. One such layer (the aforementioned ephemeral drawing layer) enables participants to draw directly on their screens (with either a fingertip or stylus or mouse), and thereby collaborate with the other participants visually. One peer participant might then use a fingertip to draw a circle around a certain person in the focal scene, which all participants see in real-time. The circular line drawn by that particular participant may only be temporary, serving to identify a focal point within the scene, and then the line dissolves and disappears shortly after being drawn (hence ephemeral). However, now that the participant has drawn attention to a particular person in the scene, he or she may audibly pose the question to all other participants (via the audio layer), "Who is this person?"

As an example of the extensibility of the system, another participant who may have optionally purchased or been granted additional layers might then tap a screen object in their dimensional stack to activate a $3^{rd}$-party facial-recognition layer. At that point, a dimensional layer that is purpose-built for facial recognition might be activated, which uses the video supplied by the current background layer in the continuum as an input to its algorithms for facial identification. The participant who activates this layer might also interact with some screen objects or widgets supplied by the 3rd-party facial recognition layer, one of which might be a button labeled "Identify Who?". Tapping this button and then tapping on or within the face of the person in question in the focus video would then feed a set of coordinates to the facial recognition layer, which it could then use to further narrow its search to a single specific person in the scene. Once identified, it might then be able to track that person going forward in the live video scene, and continually report the identity by projecting the person's name onto its own transparent layer, in such a way that it appears floating above the location of their face when both the facial-recognition layer and the background video layer are viewed together by any participant.

Thus, the $3^{rd}$-party developer who develops such a facial-recognition layer does not need to develop the rest of the system; they simply start with the video feed available to their plug-in dimensional layer through the continuum, and use that video to identify a face, focusing its search based on a location identified by the participant's touch location, which is again supplied by the continuum. In addition, such a $3^{rd}$-party dimensional layer may connect with its own $3^{rd}$-party database through a service plane of the continuum, perhaps in order to access a list of possible identities, and it may also connect to its own $3^{rd}$-party server or custom hardware via the continuum in order to provide raw processing capacity to run its compute-intensive algorithms. In this way, the system itself, as well as the participant computing devices, are not required to have any special hardware or software in order to support an added $3^{rd}$-party dimensional layer; the system itself acts as a real-time conduit between participants and other humans, devices, objects, agents and environments.

These examples show the power of embodiments of the ESVIE system as an immersive, multidimensional, real-time platform with plug-in extensibility.

Embodiments of the ESVIE system physically and logically may include several major components: a session server (e.g., cloud-based server), which is the physical and logical core of the system; participant computing devices (e.g., smartphone, tablet, desktop), which are physical devices that enable participants and agents to connect to a session via the continuum; sensory interaction devices (e.g., touch screen with haptic response, VR headset with surround-sound audio and IR-based hand detection), which are physical devices that enable humans to interact with dimensional layers and the continuum through their participant computing devices; a local or wide-area network (e.g., the Internet), and three or more protocol stacks (network, continuum, and dimensional), which implement methods that define the interaction between the physical and logical components, and which may be embodied by various software or firmware technologies and techniques. In at least some such embodiments, the network stack is characterized by methods which define the low-level interconnectivity of the physical devices, and may include existing standards-based protocol stacks (e.g., TCP/UDP/etc.), as well as custom protocols. In at least some such embodiments, the continuum stack is characterized by methods which enable independent, asynchronous, simultaneous, wide-area, and real-time remote experience sessions, each of which supports a potentially unlimited number of possible participants, participant computing devices, sensory interaction devices, and real world physical devices, and each of which supports a potentially unlimited number of possible dimensional layers of multidirectional information flow and multisensory interaction, as will be described herein. In at least some such embodiments, the dimensional stack is characterized by methods which define the individual "plug-in" dimensional layers of discrete content and perspective, and can logically be viewed as a set of super-objects, which will be described herein.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. It will similarly be appreciated that data structures discussed above may be structured in different manners, including for databases or user interface screens/pages or other types of data structures, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited by the exemplary details. In addition, while certain aspects of the invention may be now or later presented in certain claim forms, the inventors contemplate the various aspects of the invention in any available claim form. For example, while only some aspects of the invention may be initially recited as being embodied in a computer-readable medium, other aspects may likewise be so embodied.

What is claimed is:

1. A computer-implemented method comprising:
   providing, by one or more configured computing systems, an extensible communication system that manages visual interactions between users, including:
      providing a plurality of system-provided layers that each implement an associated type of functionality available to be included in the visual interactions;
      providing extensibility capabilities to enable additional entities to add additional entity-provided layers that each implement an additional type of functionality available to be included in the visual interactions; and
      providing integration capabilities to combine visual aspects from multiple selected layers to create resulting visual information for use in the visual interactions, including resolving conflicts between the multiple selected layers using priorities associated with the multiple selected layers to control whether some information from lower-priority layers is included in the resulting visual information; and
   using, by the one or more configured computing systems, the extensible communication system to manage a session of visual interactions between multiple users using Web browsers executing on client devices of the multiple users, including:
      receiving a selection of multiple layers to use in the session, wherein the multiple layers include at least one system-provided layer and at least one additional entity-provided layer, and wherein each of the multiple layers specifies a data source that provides information to be shown in that layer and specifies one or more functions for users to interact with the provided information for that layer to provide at least one type of functionality for that layer as part of the visual interactions of the users;
      using the integration capabilities to combine visual aspects of the selected multiple layers in a resulting visible sphere around a center point that includes views in multiple directions from the center point, wherein the visible sphere includes visual information from each of the multiple layers;
      initiating the session by, for each of the multiple users, participating in interactions with a Web browser that is executing on a client device of the user to determine an initial view orientation of the user that is one of the multiple directions from the center point, and to transmit visual information to the Web browser of the user that corresponds to a subset of the visible sphere that is visible from the center point using the determined initial view orientation of the user; and
      continuing the session over time by performing further interactions with the Web browsers to update visual information being displayed to the multiple users based on actions of at least some of the multiple users and to perform communications between the multiple users.

2. The computer-implemented method of claim 1 wherein the receiving of the selection of the multiple layers to use in the session includes receiving information about a user-provided layer from one of the multiple users that includes one or more virtual objects provided by the one user, wherein the actions of the at least some users includes one or more other users different from the one user manipulating at least one of the virtual objects to cause one or more modifications to the at least one virtual object, and wherein the updating of the visual information being displayed to the multiple users includes updating a visual representation of the at least one virtual object that is displayed to the multiple users to reflect the one or more modifications.

3. A system, comprising:
one or more hardware processors of one or more computing systems; and
one or more memories with stored instructions that, when executed by at least one of the one or more hardware processors, cause the one or more computing systems to perform automated operations to implement an extensible shared visual interaction system from a first entity that manages sessions between client devices in which multiple users interact with shared visual information, and that provides predefined types of functionality available to be selectively included in the sessions and each associated with and implemented by one of a plurality of predefined system-provided layers, and that further provides extensibility capabilities to enable additional entities to add additional entity-provided layers each implementing an associated additional type of functionality available to be selectively included in the sessions, wherein the additional type of functionality of each of the additional entity-provided layers is not included in the system-provided types of functionality, and wherein each of the predefined system-provided layers and the additional entity-provided layers specifies a respective data source that provides information to be shown in that layer and specifies one or more functions for users to interact with the provided information for that layer to provide the respective type of functionality associated with that layer, the automated operations including at least:
receiving a selection of multiple layers to use in a session that include at least one system-provided layer and at least one additional entity-provided layer;
combining the multiple layers to create an initial version of shared visual information for the session that includes one or more views in one or more directions having information combined from each of the multiple layers, wherein at least some of the shared visual information is acquired from an actual physical environment of at least one of the multiple users, and wherein the combining includes resolving conflicts between information in the multiple layers as part of selecting information from the multiple layers to include in the initial version of the shared visual information for the session;
initiating the session by transmitting at least some of the initial version of the shared visual information to each of the client devices of the multiple users, including transmitting to each of the multiple users at least one of the one or more views with at least some of the information combined from each of the multiple layers for display to the user; and
continuing the session over time by further interacting with the client devices of the multiple users to update the shared visual information being displayed to the multiple users based at least in part on interactions of at least some of the multiple users with displayed shared visual information for the session and using types of functionality provided by each of multiple layers of the session.

4. The system of claim 3 wherein the multiple layers are specified by one or more of the multiple users, wherein at least one of the multiple layers includes at least one permission specified by at least one of the multiple users, and wherein the managing of the session further includes, before updating the shared visual information based at least in part on the interactions of the at least some users with the displayed shared visual information for the session, determining that the interactions are with the at least one layer and are allowed by the at least one permission.

5. The system of claim 4 wherein one of the interactions of one of the at least some users includes at least one of adding or removing or changing a virtual object for one of the at least one layers, and wherein the determining that the interactions are allowed by the at least one permission includes determining that the one user is authorized to perform the at least one of the adding or removing or changing.

6. The system of claim 3 wherein one of the interactions of one of the at least some users includes at least one of adding or removing a layer for the session, and wherein the managing of the session further includes, before updating the shared visual information based at least in part on the interactions of the at least some users with the displayed shared visual information for the session, determining that the one interaction is allowed to be performed by the one user.

7. The system of claim 3 wherein the managing of the session further includes receiving instructions to perform a change involving at least one of adding or removing a user for the session, and determining that the change is allowed to be performed, and wherein the continuing of the session over time includes providing the shared visual information after the change to a modified group of users based on the change.

8. The system of claim 3 wherein the multiple layers have associated information to specify a relative ordering of the multiple layers, and wherein the specified relative ordering is used for the resolving of the conflicts between the information from the multiple layers during the combining of the multiple layers.

9. The system of claim 3 wherein the multiple layers have associated information to specify a relative priority of the multiple layers, and wherein the specified relative priority is used for the resolving layers the conflicts between the information from the multiple layers during the combining of the multiple layers.

10. The system of claim 3 wherein the at least one type of functionality implemented by each of one or more layers of the multiple layers includes functionality within a gaming environment, and wherein the managing of the session includes managing a game involving the multiple users within the gaming environment.

11. The system of claim 3 wherein the at least one type of functionality implemented by each of one or more layers of the multiple layers includes functionality to support operations of a company, and wherein the managing of the session includes managing multiple employees performing the operations for the company.

12. The system of claim 3 wherein one of the multiple layers has multiple virtual objects that include one or more virtual objects added by one or more users of the multiple users, and wherein the managing of the session further includes providing a shared context of the one layer for the multiple virtual objects to allow interactions and sharing of information between the multiple virtual objects.

13. The system of claim 12 wherein the multiple virtual objects have virtual locations that are specified in relation to each other, and wherein the combining of the multiple layers to create an initial version of the shared visual information includes generating the one or more views in the one or more directions to include visual representations of the multiple virtual objects placed based on the virtual locations.

14. The system of claim 3 wherein the managing of the session further includes providing further shared information to the multiple users that includes at least of audio information or haptic information, wherein the transmitting of the at least some initial version of the shared visual information includes transmitting at least some of the further shared information, and wherein the continuing of the session over time further includes updating the further shared information based at least in part on the interactions of the at least some users.

15. The system of claim 3 wherein the client devices of the multiple users are at multiple geographical locations, and wherein the transmitting and the updating includes sending information over one or more computer networks between the multiple geographical locations.

16. The system of claim 3 wherein the updating are performed in a real-time manner in response to the interactions of the at least some users, such that the multiple users view receive substantially the same shared visual information at the same time that is updated as the interactions of the at least some users occur.

17. A non-transitory computer-readable medium having stored contents that cause one or more computing systems to perform automated operations including at least:
receiving, by the one or more computing systems, and for use in an interaction session involving at least a first user, a selection of multiple layers, wherein each of the multiple layers specifies a data source that provides at least one type of information to be presented in shared visual information for the interaction session and specifies one or more functions for interaction with that provided at least one type of information, wherein one or more first layers of the multiple layers are predefined layers that are part of an extensible shared visual interaction system from a first entity and that each has an associated type of predefined functionality provided by the shared visual interaction system, and wherein one or more second layers of the multiple layers are additional entity-provided layers provided by one or more additional entities and each implementing an associated additional type of functionality distinct from predefined functionality types provided by the shared visual interaction system;
combining, by the one or more computing systems, information provided by the multiple layers to create an initial version of the shared visual information that includes one or more views in one or more directions and that has visual information from each of the multiple layers, wherein the combining includes resolving conflicts between information in the multiple layers as part of selecting information from the multiple layers to include in the initial version of the shared visual information;
initiating, by the one or more computing systems, the interaction session by transmitting the initial version of the shared visual information to one or more client devices of one or more users, including transmitting the initial version of the shared visual information to a first client device of the first user for display to the first user; and
continuing, by the one or more computing systems, the interaction session over time by further interacting with the one or more client devices to update the shared visual information based at least in part on interactions of the first user with one or more virtual objects having visual representations overlaid on the shared visual information.

18. The non-transitory computer-readable medium of claim 17 wherein the one or more computing systems implement the extensible shared visual interaction system, wherein the one or more first layers are provided by the extensible shared visual interaction system for use in a plurality of interaction sessions involving a plurality of users, and wherein at least one other layer of the second layers is a new layer defined by the first user for use in the interaction session.

19. A computer-implemented method comprising:
receiving, by one or more computing systems, and for use in an interaction session involving at least a first user, a selection of multiple layers that each provides at least one type of information to be presented in shared visual information for the interaction session, wherein at least one of the multiple layers is associated with an actual physical environment, wherein one or more first layers of the multiple layers are predefined layers that are part of an extensible shared visual interaction system from a first entity and that each has an associated type of predefined functionality provided by the shared visual interaction system, and wherein one or more second layers of the multiple layers are additional entity-provided layers provided by one or more additional entities and each implementing an associated additional type of functionality distinct from predefined functionality types provided by the shared visual interaction system;
combining, by the one or more computing systems, information provided by the multiple layers to create an initial version of the shared visual information that includes one or more views in one or more directions and that has visual information from each of the multiple layers, wherein some of the shared visual information is acquired from the physical environment and other of the shared visual information includes visual representations of one or more virtual objects that each represents another user in the physical environment, and wherein the combining includes resolving conflicts between information in the multiple layers as part of selecting information from the multiple layers to include in the initial version of the shared visual information;
initiating, by the one or more computing systems, the interaction session by transmitting the initial version of the shared visual information to one or more client devices of one or more users, including transmitting the initial version of the shared visual information to a first client device of the first user for display to the first user; and
continuing, by the one or more computing systems, the interaction session over time by further interacting with the one or more client devices to update the shared visual information based at least in part on interactions of the first user with the one or more virtual objects, the interactions causing communications to be sent to one or more other users in the physical environment that the one or more virtual objects represent.

20. The computer-implemented method of claim 19 wherein the one or more computing systems implement the extensible shared visual interaction system, wherein the one or more first layers are provided by the extensible shared visual interaction system for use in a plurality of interaction sessions involving a plurality of users, and wherein at least one other layer of the second layers is a new layer defined by the first user for use in the interaction session.

\* \* \* \* \*

UNITED STATES PATENT AND TRADEMARK OFFICE
CERTIFICATE OF CORRECTION

PATENT NO. : 11,722,537 B2
APPLICATION NO. : 17/138637
DATED : August 8, 2023
INVENTOR(S) : Charles A. Andon et al.

It is certified that error appears in the above-identified patent and that said Letters Patent is hereby corrected as shown below:

In the Claims

Column 30, Line 41, Claim 9:
"used for the resolving layers the conflicts between the" should read --used for the resolving of the conflicts between the--.

Signed and Sealed this
Fifth Day of September, 2023

Katherine Kelly Vidal
*Director of the United States Patent and Trademark Office*